United States Patent
Srinivasan et al.

(10) Patent No.: US 11,884,293 B2
(45) Date of Patent: Jan. 30, 2024

(54) OPERATOR ASSISTANCE FOR AUTONOMOUS VEHICLES

(71) Applicant: UATC, LLC, San Francisco, CA (US)

(72) Inventors: Arvind Srinivasan, Menlo Park, CA (US); Samann Ghorbanian-Matloob, San Francisco, CA (US); Sean Shanshi Chen, San Francisco, CA (US); Eli Schleifer, San Francisco, CA (US); Shelley Bower, Denver, CO (US); Patrick Willett, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/752,292

(22) Filed: Jan. 24, 2020

(65) Prior Publication Data

US 2020/0239023 A1 Jul. 30, 2020

Related U.S. Application Data

(60) Provisional application No. 62/868,347, filed on Jun. 28, 2019, provisional application No. 62/836,936, (Continued)

(51) Int. Cl.
*B60W 60/00* (2020.01)
*G01C 21/34* (2006.01)
(Continued)

(52) U.S. Cl.
CPC ...... *B60W 60/0011* (2020.02); *B60W 60/001* (2020.02); *G01C 21/343* (2013.01);
(Continued)

(58) Field of Classification Search
CPC .......... B60W 60/0011; B60W 60/001; B60W 50/029; G01C 21/3453; G01C 21/343;
(Continued)

(56) References Cited

U.S. PATENT DOCUMENTS 10,564,638 B1 * 2/2020 Lockwood .............. G05D 1/00
11,067,983 B2 * 7/2021 Kentley-Klay .... G01C 21/3453
(Continued)

FOREIGN PATENT DOCUMENTS

| WO | 2016183525 | 11/2016 |
|----|------------|---------|
| WO | 2017079460 | 5/2017  |
| WO | 2020154676 | 7/2020  |

OTHER PUBLICATIONS

"International Application Serial No. PCT US2020 015075, International Preliminary Report on Patentability dated Mar. 3, 2021", 7 pgs.

(Continued)

*Primary Examiner* — Faris S Almatrahi
*Assistant Examiner* — Abdalla A Khaled
(74) *Attorney, Agent, or Firm* — SCHWEGMAN LUNBERG & WOESSNER, P.A.

(57) ABSTRACT

Disclosed are autonomous vehicles that may autonomously navigate at least a portion of a route defined by a service request allocator. The autonomous vehicle may, at a certain portion of the route, request remote assistance. In response to the request, an operator may provide input to a console that indicates control positions for one or more vehicle controls such as steering position, brake position, and/or accelerator position. A command is sent to the autonomous vehicle indicating how the vehicle should proceed along the route. When the vehicle reaches a location where remote assistance is no longer required, the autonomous vehicle is (Continued)

released from manual control and may then continue executing the route under autonomous control.

20 Claims, 13 Drawing Sheets

Related U.S. Application Data filed on Apr. 22, 2019, provisional application No. 62/796,882, filed on Jan. 25, 2019.

(51) Int. Cl.
| | |
|---|---|
| *G05D 1/00* | (2006.01) |
| *G07C 5/00* | (2006.01) |
| *G08G 1/0967* | (2006.01) |
| *G05D 1/02* | (2020.01) |

(52) U.S. Cl.
CPC ....... *G01C 21/3453* (2013.01); *G05D 1/0011* (2013.01); *G05D 1/0027* (2013.01); *G05D 1/0088* (2013.01); *G05D 1/0212* (2013.01); *G05D 1/0231* (2013.01); *G05D 1/0276* (2013.01); *G07C 5/008* (2013.01); *G08G 1/096783* (2013.01); *G05D 2201/0213* (2013.01)

(58) Field of Classification Search
CPC .. G05D 1/0027; G05D 1/0011; G05D 1/0088; G05D 1/0212; G05D 1/0231; G05D 1/0276; G05D 2201/0213; G05D 1/0038; G07C 5/008; G08G 1/096783
See application file for complete search history.

(56) References Cited

U.S. PATENT DOCUMENTS

| | | | |
|---|---|---|---|
| 11,099,561 B1* | 8/2021 | Kentley-Klay | G01C 21/32 |
| 2015/0154867 A1 | 6/2015 | Tseng et al. | |
| 2016/0026180 A1* | 1/2016 | Tsimhoni | G06Q 50/00 701/23 |
| 2017/0192423 A1* | 7/2017 | Rust | G05D 1/0238 |
| 2017/0192437 A1 | 7/2017 | Bier et al. | |
| 2017/0277181 A1* | 9/2017 | Fairfield | G05D 1/0044 |
| 2017/0316333 A1 | 11/2017 | Levinson et al. | |
| 2018/0004214 A1* | 1/2018 | Wisniowski | G08G 1/09675 |
| 2018/0023966 A1* | 1/2018 | Iwai | G08G 1/0112 701/423 |
| 2018/0088571 A1 | 3/2018 | Weinstein-Raun | |
| 2018/0105184 A1* | 4/2018 | Urano | B60W 30/09 |
| 2018/0136651 A1* | 5/2018 | Levinson | B60W 30/00 |
| 2018/0279175 A1* | 9/2018 | Gholmieh | H04L 47/6215 |
| 2019/0004527 A1 | 1/2019 | Fairfield et al. | |
| 2019/0019416 A1 | 1/2019 | Perko | |
| 2019/0049948 A1* | 2/2019 | Patel | G05D 1/0027 |
| 2019/0163176 A1* | 5/2019 | Wang | G05D 1/0027 |
| 2019/0196465 A1* | 6/2019 | Hummelshøj | G06V 20/56 |
| 2019/0270408 A1* | 9/2019 | Castro | B60Q 9/00 |
| 2019/0271985 A1* | 9/2019 | Mimura | G01C 21/3658 |
| 2019/0302761 A1* | 10/2019 | Huang | G05D 1/0221 |
| 2019/0354111 A1* | 11/2019 | Cheng | G05D 1/0027 |
| 2019/0385460 A1* | 12/2019 | Magzimof | G08G 1/096725 |
| 2019/0387060 A1* | 12/2019 | Kentley-Klay | G05D 1/024 |
| 2020/0033853 A1* | 1/2020 | Araújo | G05D 1/0231 |
| 2020/0150653 A1* | 5/2020 | Goldman | H04W 4/40 |
| 2020/0183394 A1* | 6/2020 | Lockwood | G07C 5/008 |
| 2020/0239024 A1 | 7/2020 | Srinivasan et al. | |
| 2020/0282980 A1* | 9/2020 | Kinoshita | G06V 40/174 |
| 2021/0197808 A1* | 7/2021 | Maeda | B60W 60/005 |

OTHER PUBLICATIONS

"International Application Serial No. PCT US2020 015075, International Search Report dated May 6, 2020", 4 pgs.
"International Application Serial No. PCT US2020 015075, Written Opinion dated May 6, 2020", 6 pgs.
"U.S. Appl. No. 16/752,164, Non Final Office Action dated Jun. 25, 2021", 18 pgs.
"U.S. Appl. No. 16/752,164, Response filed Sep. 27, 2021 to Non Final Office Action dated Jun. 25, 2021", 13 pgs.
"U.S. Appl. No. 16/752,164, Final Office Action dated Dec. 15, 2021", 23 pgs.
"European Application Serial No. 20707954.2, Communication Pursuant to Article 94(3) EPC dated Feb. 21, 2022", 8 pgs.
U.S. Appl. No. 16/752,164, filed Jan. 24, 2020, Autonomous Vehicle Routing With Roadway Element Impact.
"European Application Serial No. 20707954.2, Response filed Jun. 22, 2022 to Communication Pursuant to Article 94(3) EPC dated Feb. 21, 2022", 29 pgs.
"European Application Serial No. 20707954.2, Communication Pursuant to Article 94(3) EPC dated Oct. 7, 2022", 4 pages.
"European Application Serial No. 20707954.2, Communication Pursuant to Article 94(3) EPC dated Mar. 9, 2023", 4 pgs.
"European Application Serial No. 20707954.2, Response filed Jan. 6, 2023 to Communication Pursuant to Article 94(3) EPC dated Oct. 7, 2022", 18 pgs.
"European Application Serial No. 20707954.2, Response filed Jun. 16, 2023 to Communication Pursuant to Article 94(3) EPC dated Mar. 9, 2023", 14 pgs.

\* cited by examiner

OPERATOR ASSISTANCE FOR AUTONOMOUS VEHICLES

CROSS REFERENCE TO RELATED APPLICATIONS

This application claims priority to U.S. Provisional Application No. 62/796,882, filed Jan. 25, 2019 and entitled "Real Time Remote Operator Triggering for High Cost Map Constraints." This application also claims priority to U.S. provisional Application No. 62/836,936, filed Apr. 22, 2019, and entitled "Operator Assistance for Autonomous Vehicles." This application also claims priority to U.S. Provisional Application No. 62/868,347, filed Jun. 28, 2019, and entitled "Autonomous Vehicle Routing with Route Component Impact." The contents of these prior applications are considered part of this application and are hereby incorporated by reference in their entireties.

FIELD

This document pertains generally, but not by way of limitation, to devices, systems, and methods for operating and/or managing an autonomous vehicle.

BACKGROUND

An autonomous vehicle is a vehicle that is capable of sensing its environment and operating some or all of the vehicle's controls based on the sensed environment. Autonomous vehicles include a control system that receives information from a variety of on-board sensors and generates signals to control steering, braking, and acceleration of the vehicle. These control systems are tested under a wide variety of conditions that may be encountered when the vehicle is providing transportation services. However, not all situations the vehicle may encounter can be predicted and built into the vehicle control system. Thus, improved methods for autonomous vehicle control are necessary.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

Figure 5:
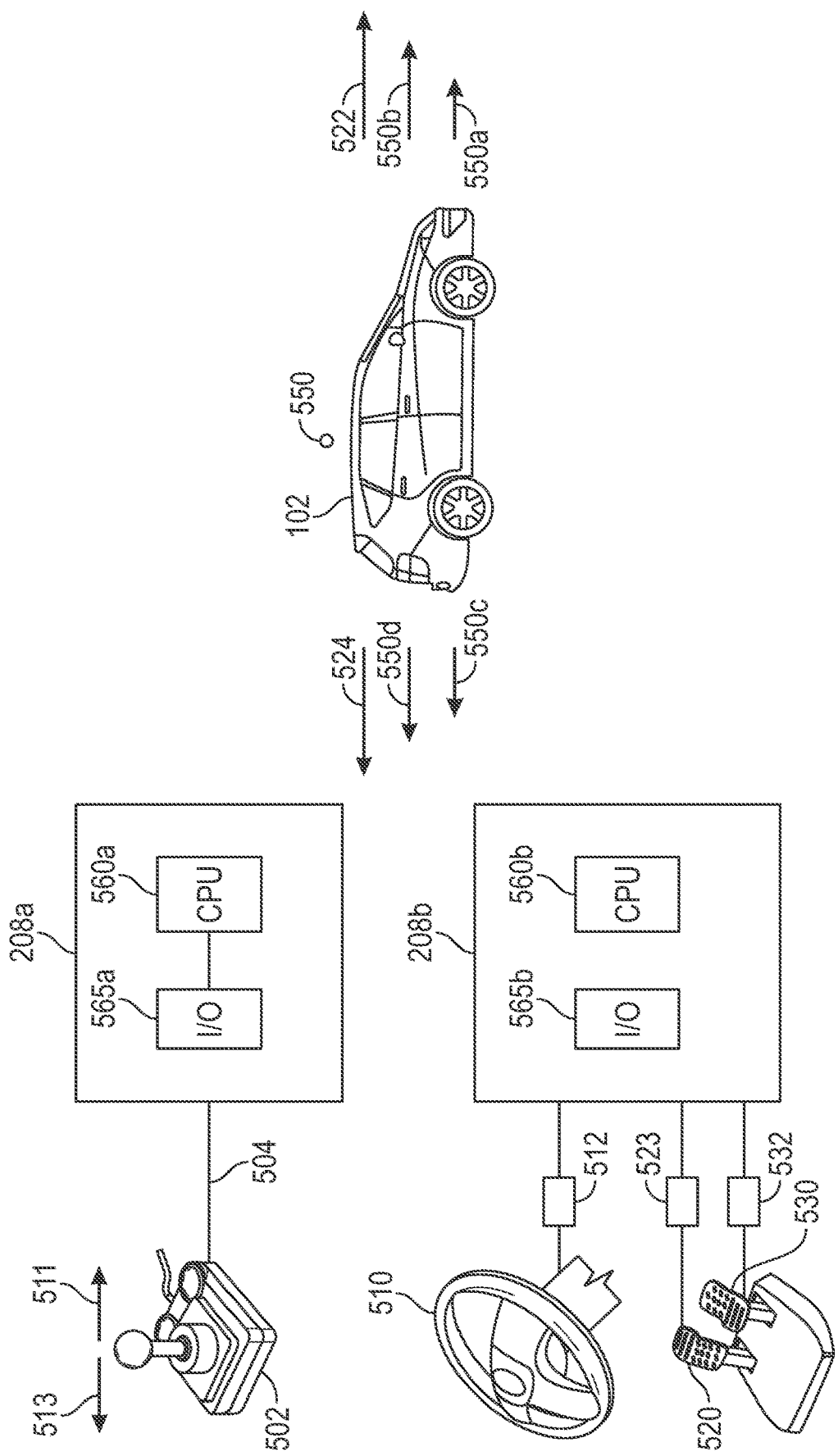

FIG. 5 includes two example embodiments of a remote controller.

Figure 6:
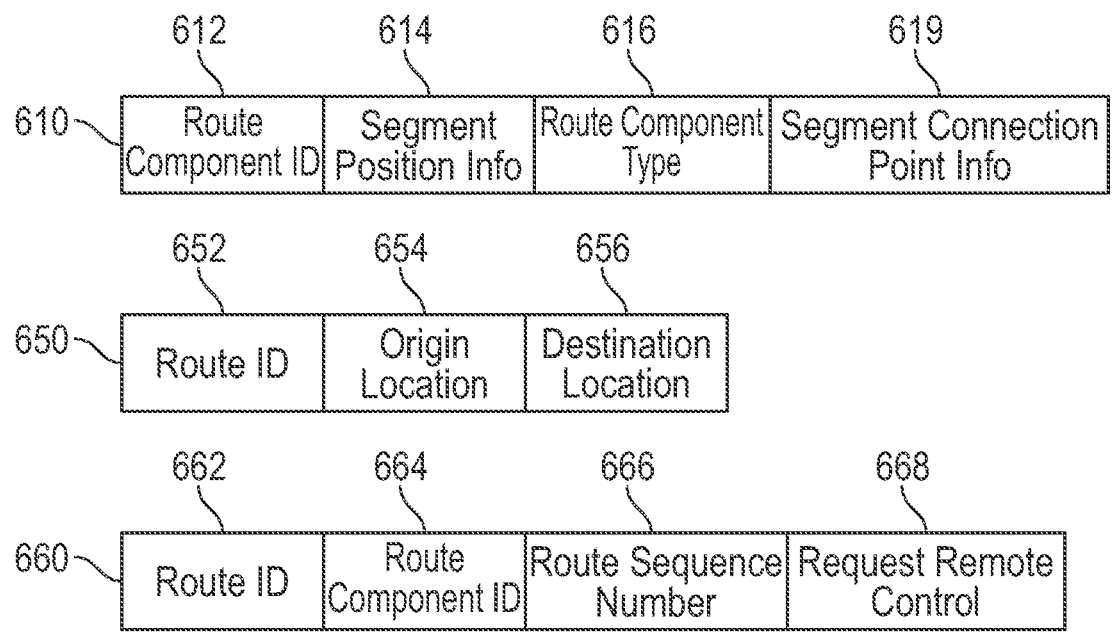

FIG. 6 is a block diagram showing example data structures that may be implemented in one or more of the disclosed embodiments.

Figure 7:
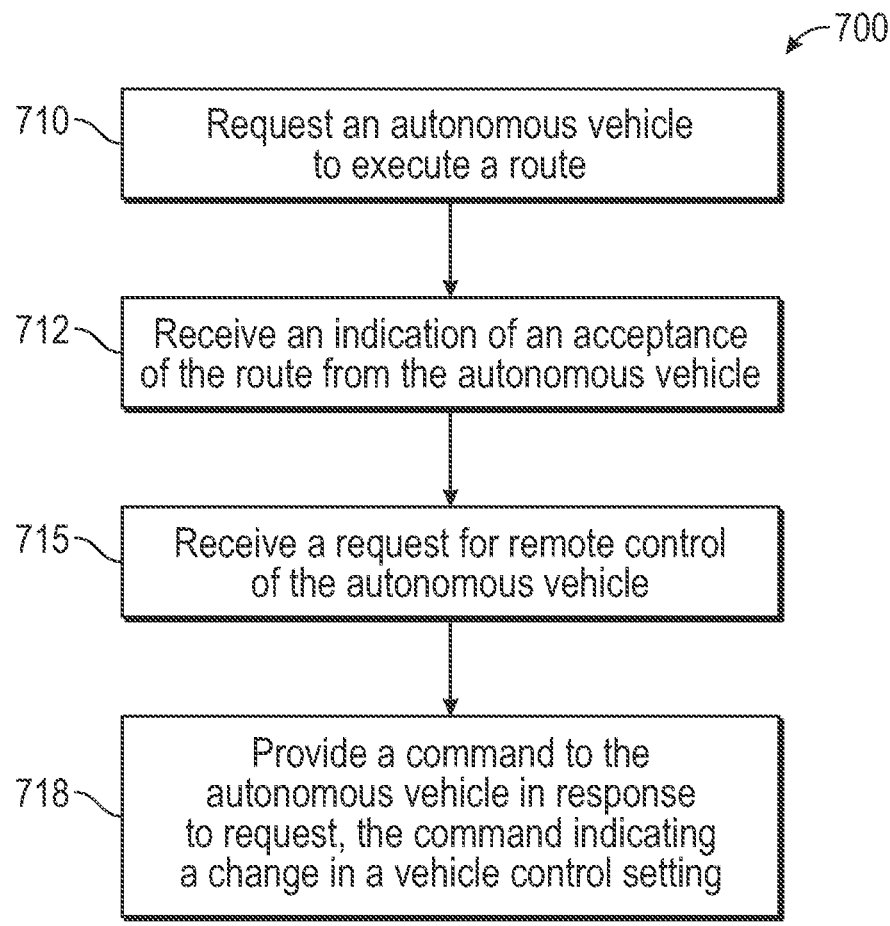

FIG. 7 is a flowchart showing one example of a process flow that can be executed by the service request allocator in some embodiments.

Figure 8:
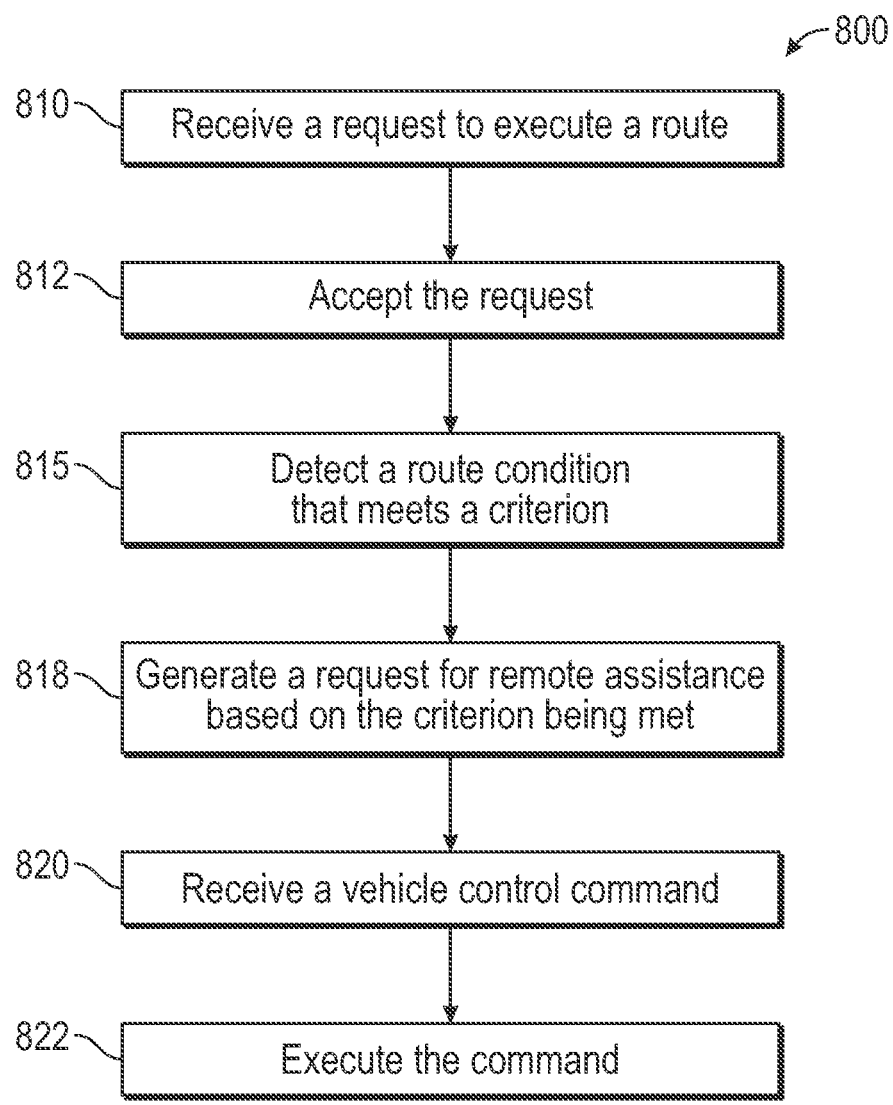

FIG. 8 is a flowchart showing one example of a process flow that can be executed by an autonomous vehicle in some embodiments.

Figures 9, 10, 11:
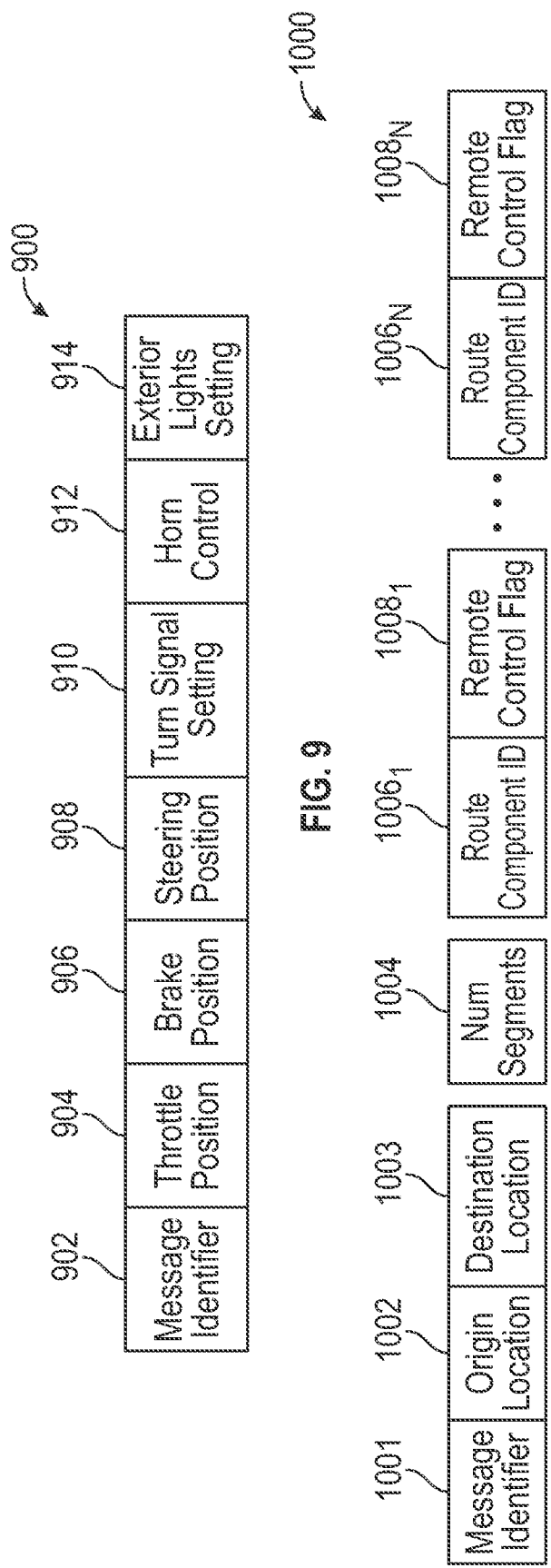

FIG. 9 is an example message format for a vehicle control message.

FIG. 10 shows an example format for a service request message.

FIG. 11 shows an example format of a remote-control request message.

Figure 12:
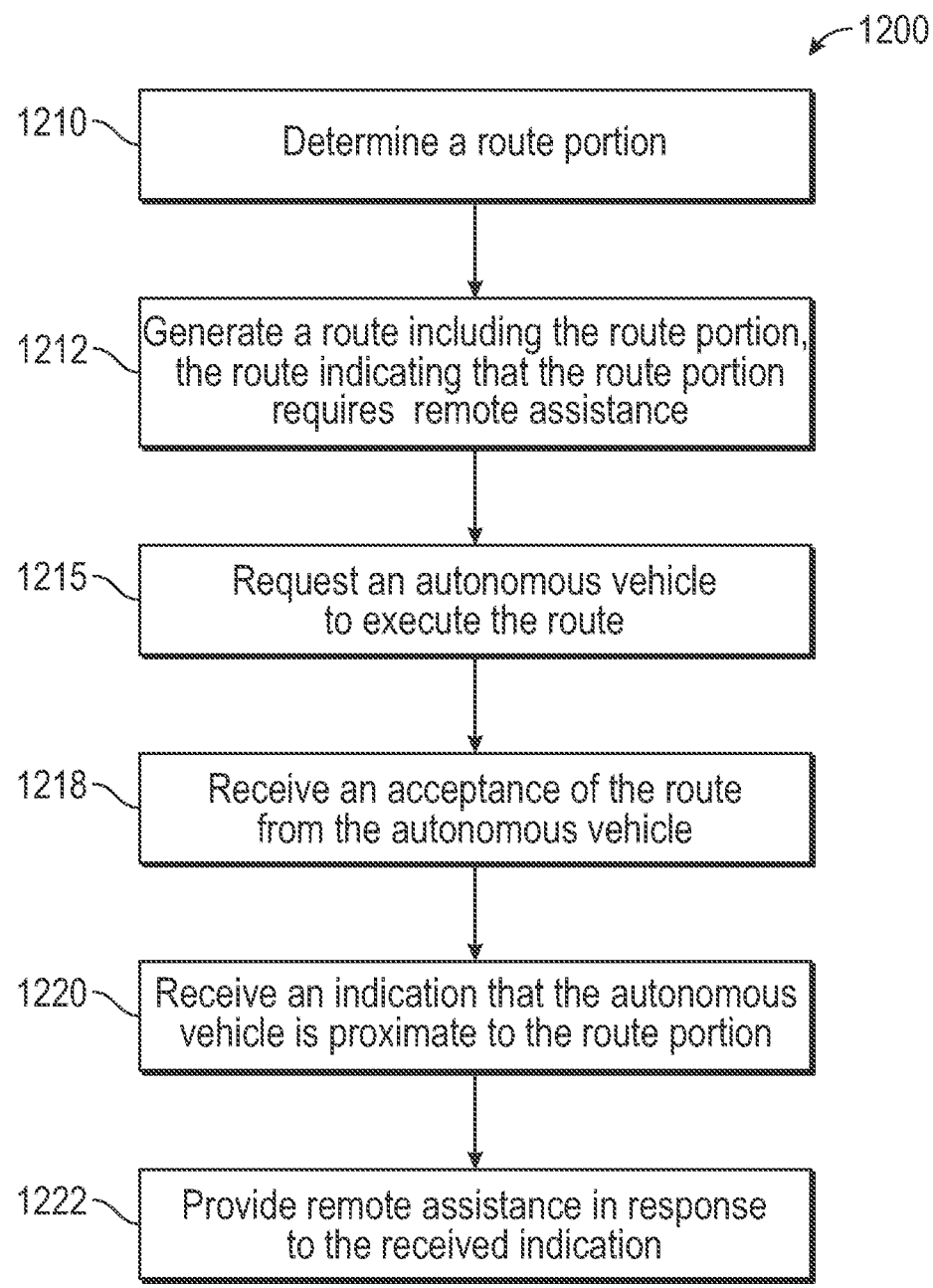
Figure 13:
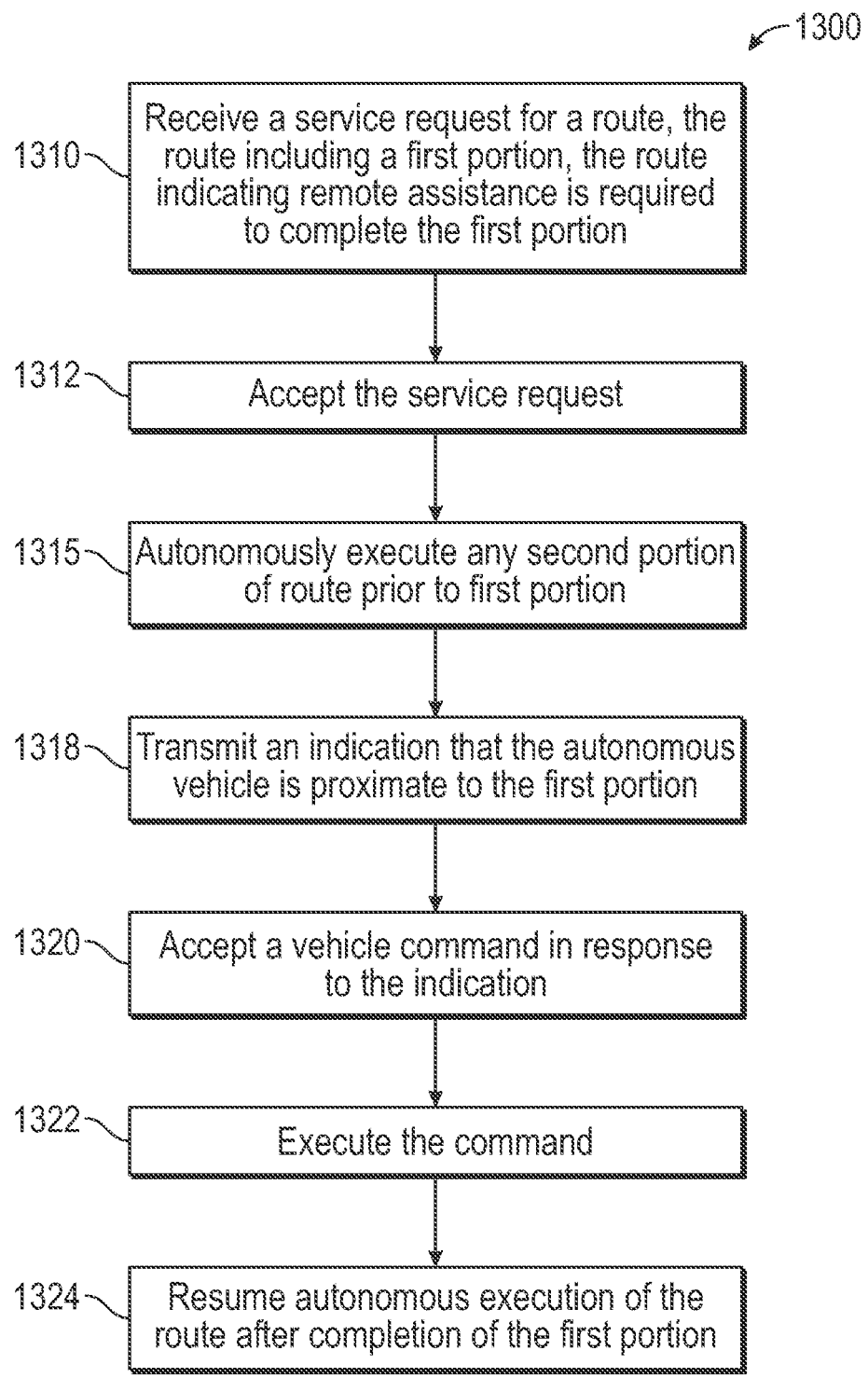

FIG. 12 is a flowchart showing one example of a process flow, all or portions of which may be executed by the service request allocator and/or remote controller in some embodiments FIG. 13 is a flowchart showing one example of a process flow, all or portions of which may be executed by the autonomous vehicle in some aspects.

Figure 14:
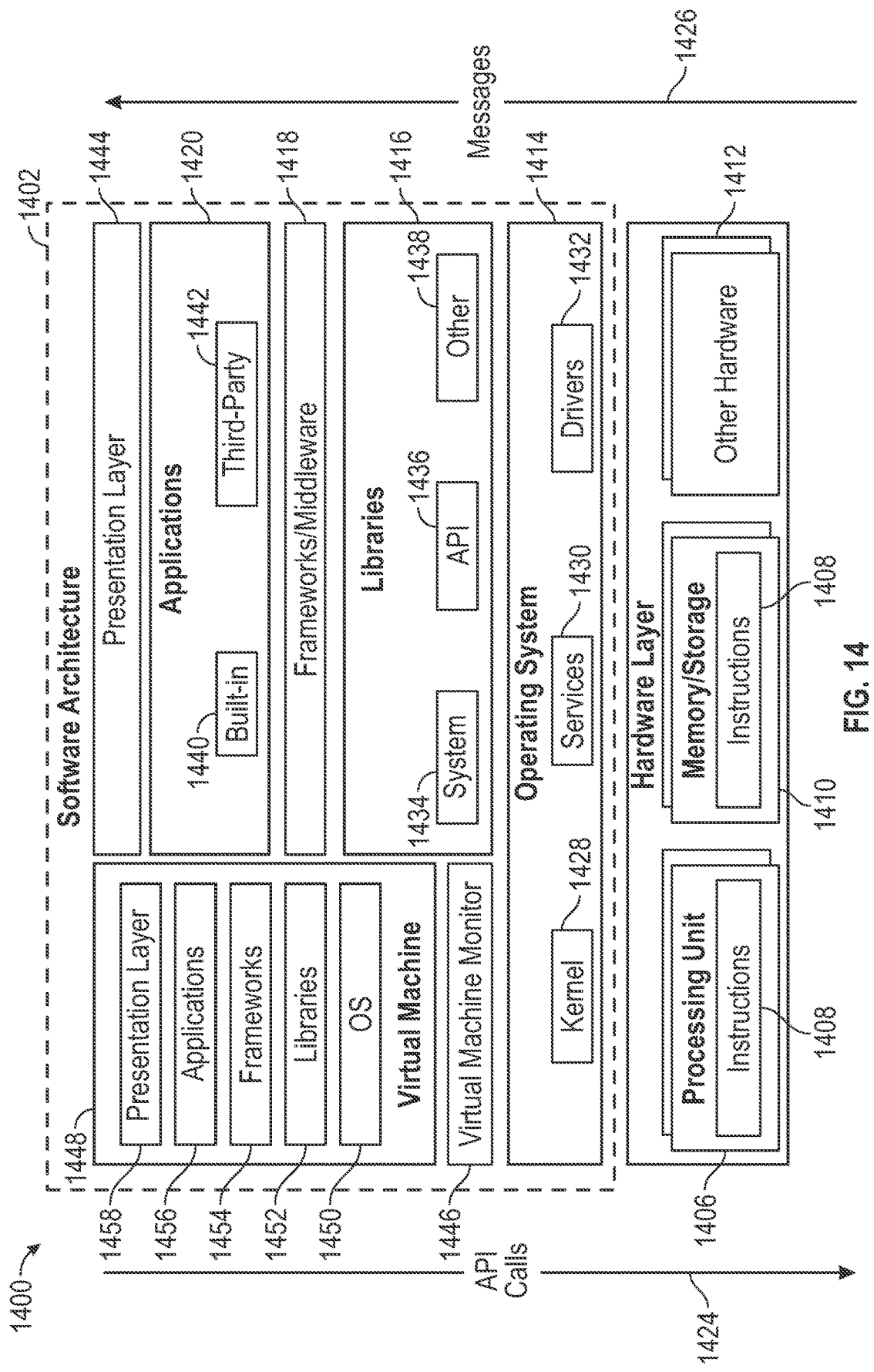

FIG. 14 is a block diagram showing one example of a software architecture for a computing device.

Figure 15:
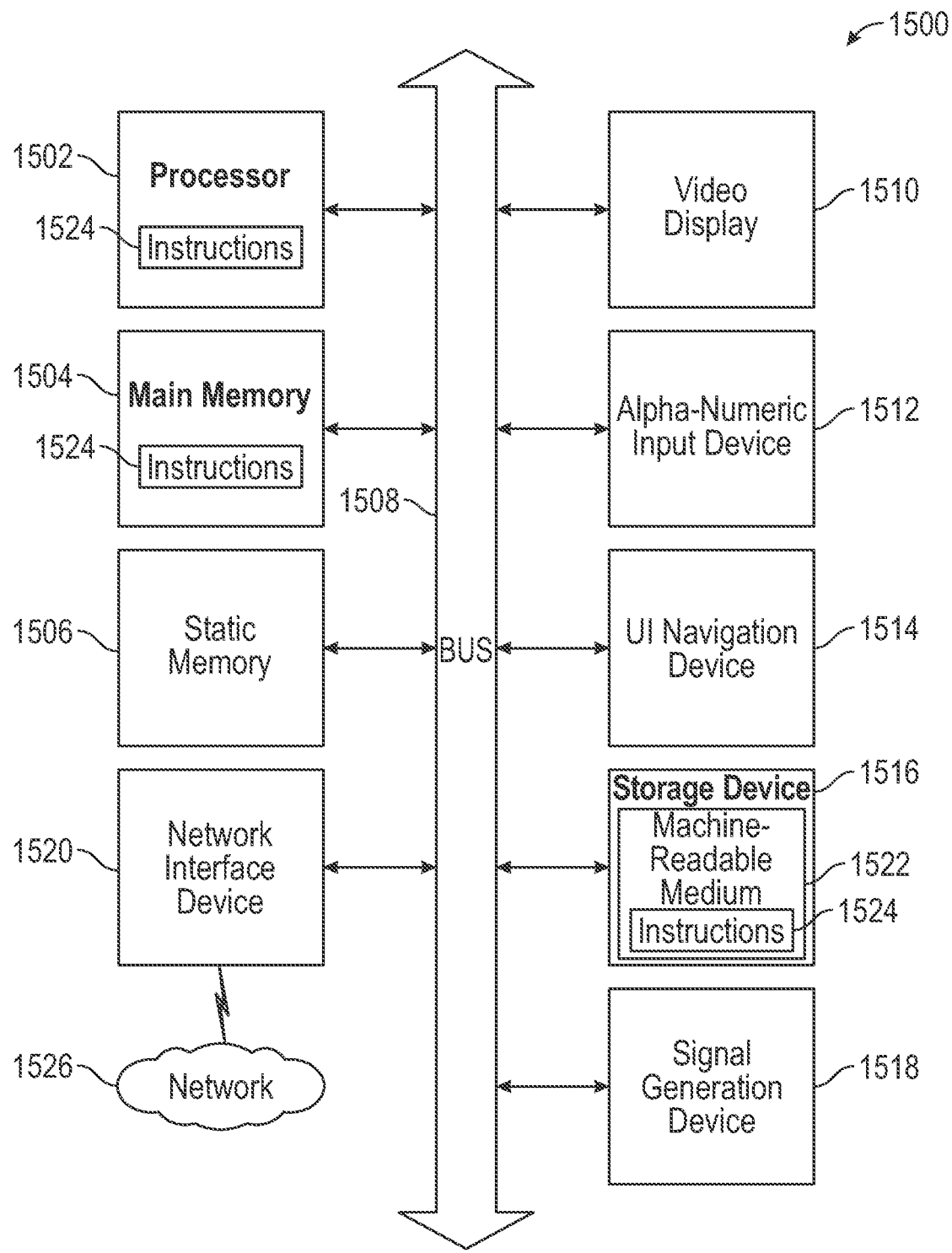

FIG. 15 is a block diagram illustrating a computing device hardware architecture.

DETAILED DESCRIPTION

Examples described herein are directed to systems and methods for routing autonomous vehicles. In an autonomous or semi-autonomous vehicle (collectively referred to as an autonomous vehicle (AV)), a vehicle autonomy system, sometimes referred to as an AV stack, controls one or more vehicle controls, such as braking, steering, or throttle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

An autonomous vehicle executes a transportation service request by traversing from an origin location to a destination location. For some transportation service requests, the vehicle picks up a passenger and/or cargo at the origin location and drops off the passenger and/or cargo at the destination location. A navigator system generates routes for an autonomous vehicle. A route is a path that an autonomous vehicle takes, or plans to take, over one or more roadways to execute a transportation service request. For example, a route can extend from an origin location to a destination location. Some transportation service requests also include one or more waypoints. In some embodiments, the autonomous vehicle is routed to the waypoints between the origin location and the destination location.

In some examples, a route includes a series of connected route components, sometimes also referred to as lane segments. Each route component corresponds to a portion of a roadway that can be traversed by the autonomous vehicle. In some examples, route components are described by a routing graph that indicates connectivity between route components and a cost for the vehicle to traverse different route components and/or to traverse between route components. A navigator system can generate a route, for example, by finding the lowest cost combination of route components between the origin location and the destination location.

Different autonomous vehicles can have different levels of capability. For example, a vehicle or type of vehicle can be described by vehicle capability data. Vehicle capability data describes constraints on how a vehicle can be routed. For example, an autonomous vehicle may not be permitted to traverse route segments having certain characteristics (e.g., a route segment including an unprotected left, or is part of a controlled access highway, etc.). In other examples, an autonomous vehicle may be routed to route segments having a set of characteristics but may have to slow down to traverse the route segments or may experience a higher risk of an intervention. This mismatch between route characteristics and/or requirements and vehicle capabilities results, in some circumstances, in a higher cost to route the vehicle through the relevant route segment. Vehicle capability data can be and/or be derived from Operational Domain (OD) or Operational Design Domain (ODD) data, if any, provided by the vehicle's manufacturer.

As discussed above, a vehicle control system for an autonomous vehicle may not be capable of successfully controlling the vehicle through all situations the vehicle may encounter while providing transportation services. For example, unexpected conditions may present themselves due to road construction, weather related events, natural disasters, mechanical failures of the vehicle sensors, or other unexpected events. If the vehicle is currently providing transportation services when it encounters such a situation, aborting the service can be inefficient and costly. For example, if the vehicle is transporting a paying passenger when it encounters an unexpected situation, aborting the service may cause substantial inconvenience to the passenger, and potentially reduce repeat business from that customer. Moreover, the passenger may share their experience with other potential passengers, via social media or more traditional in-person methods, leading to further negative consequences.

Some of the disclosed examples are directed to using a remote operator, sometimes called a teleoperator, to assist an autonomous vehicle in traversing a route. For example, the autonomous vehicle can be deliberately routed to a route component that it would not be permitted to traverse and/or would be permitted to traverse, but at a higher cost. A remote operator is queued to assist the vehicle as it approaches and traverses the selected route component. The remote operator assists the autonomous vehicle in traversing the selected route component, for example, by providing inputs to vehicle controls and/or providing instructions to the vehicle autonomy system. In this way, the autonomous vehicle can be routed via route components that may be costly or otherwise difficult to route through otherwise.

In some embodiments, the remote operator is provided with sensor data received from the autonomous vehicle. The remote operator may also be provided with the capability to instruct the autonomous vehicle. In some examples, the remote operator provides inputs to vehicle controls such as steering, braking, throttle, etc. In other examples, the remote operator provides instructions to the vehicle autonomy system. Consider an example in which the route component includes an unprotected left turn (e.g. a left turn without a traffic light where oncoming traffic must be judged to determine whether it is safe to cross one or more lanes of traffic moving in an opposite direction to the vehicle). The remote operator may observe sensor data from the autonomous vehicle (e.g. one or more front facing images/video) and provide an input to the vehicle autonomy system indicating when it is safe for the autonomous vehicle to make the turn. In another example, the remote operator system may generate and provide a motion plan for the vehicle to get around an obstacle or obstacles in the vehicle's path (e.g. navigate around a construction site or accident). In yet another example, the operator may instruct the vehicle to creep forward by a given distance (e.g., 2 meters) to obtain better visibility for its sensors.

As described herein, autonomous vehicles may be routed via route components in which remote operator assistance is planned (e.g., an assisted route component). In some embodiments, a remote operator system tracks motion of the routed autonomous vehicles and queues a remote operator for a vehicle as the vehicle approaches an assisted route component. For example, the remote operator may utilize a remote operator computing device. The remote operator system may feed sensor data received from the vehicle to the remote operator computing device at a predetermined time before the vehicle is expected to reach the assisted route component. This allows, in some embodiments, the remote operator to orient his or herself to the vehicle's position before the vehicle requires assistance. In some embodiments, the remote operator system estimates how long the remote operator will require to assist the vehicle and, in some examples, may include a suitable amount of buffer time before scheduling the same remote operator to assist another vehicle.

In some examples, a remote operator notes a roadway condition at a route component that makes it difficult for an autonomous vehicle to traverse the route component. This can occur in examples in which the remote operator's involvement with the vehicle is planned, for example, as described herein with respect to an assisted route component. It can also occur if the remote operator's involvement is unplanned, for example, if the vehicle autonomy system experiences an error and initiates, on its own, remote operator involvement.

Upon recognizing a roadway condition, in some examples, a remote operator can choose to close a route segment to other autonomous vehicles. For example, if a car is double parked and protruding into a lane of travel, the remote operator can instruct an autonomous vehicle on the scene to maneuver around the double-parked car. Additionally, the remote operator can choose to close the route segment to further autonomous vehicle traffic. The remote operator can initiate, in some embodiments, a time period for which the closure remains in effect, or that the route segment is closed indefinitely. In some examples, however, it is less costly to leave a route segment open even if some or all of the vehicles traversing the route segment will require remote operator assistance. It can be difficult for a remote operator to know when it is preferable to leave a route segment open and when it is preferable to close the route segment. Accordingly, in various examples, the remote operator system is configured to measure the cost or impact of closing a route segment and present this information to the operator via, for example, a user interface on an electronic display. The cost or impact of closing a route segment can be determined, for example, by determining the number of vehicles that would traverse the route segment, the availability of alternative routes, etc.

Some of the disclosed embodiments provide for continued vehicle operation during exceptional circumstances as described above by providing for remote operator assistance to the vehicle when the vehicle encounters a situation that the vehicle's control system is not able to handle independently. Some embodiments may initiate the operator assistance in response to an on-board vehicle control system generating a request for assistance. For example, the on-board vehicle control system may compute a confidence value or score for a course of action based on input received from a variety of vehicle sensors. If the score or confidence value meets a criterion (e.g. a highest confidence interval for any possible path forward is below a predetermined threshold confidence level), the vehicle control system may determine it is not appropriate to continue with autonomous operation in the present circumstances. In response to such a determination, the vehicle may request remote operator assistance. The request may be transmitted over a wireless connection to a vehicle support center, where a human operator is given access to the vehicle's controls.

By providing for on-demand operator assistance of autonomous vehicles, the control system of the autonomous vehicle is able to provide a majority of vehicle control, reducing cost, improving safety and reliability when compared to a human operator. However, it can be complex and equally costly to ensure that automated vehicle control systems can successful manage each and every situation that may be encountered by an autonomous vehicle during its lifetime. Thus, by providing the on-demand operator assistance, the use of both autonomous control systems and human operators are jointly employed to deliver a cost effective and robust transportation solution.

Figure 1:
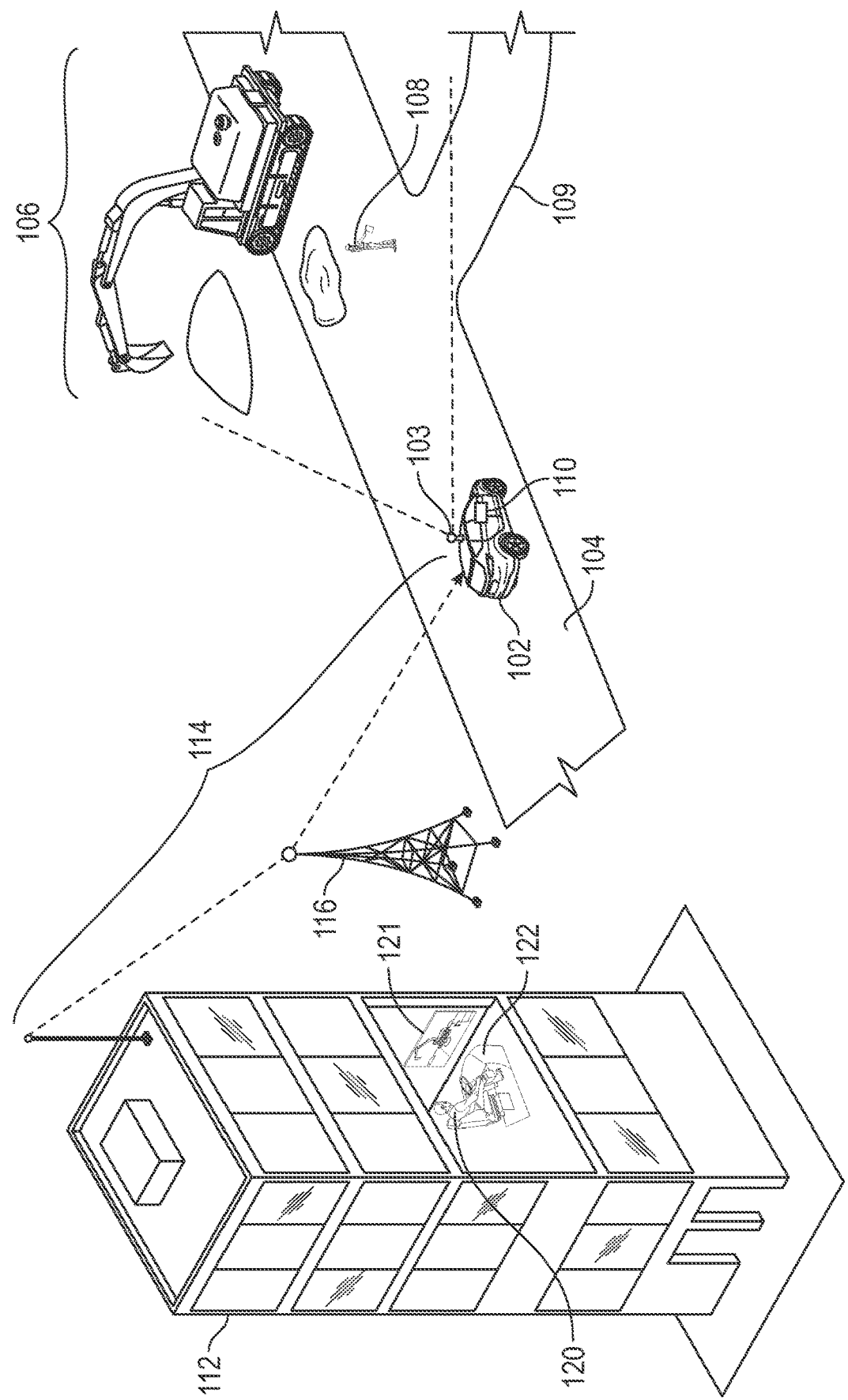
FIG. 1 is an overview diagram of an autonomous vehicle performing a transportation service according to at least one of the disclosed embodiments.

FIG. 1 is an overview diagram of an autonomous vehicle performing a transportation service according to at least one of the disclosed embodiments. FIG. 1 shows an autonomous vehicle 102 that includes at least one sensor 103. The at least one sensor 103 detects one or more attributes of the vehicle's 102 environment. For example, the one or more sensor(s) 103 may include a laser detection and ranging (LIDAR) sensor, radio detection and ranging sensor (RADAR), a visual camera, an infrared camera, and/or other sensors.

The vehicle 102 is traveling on a road 104. As shown in the example of FIG. 1, the autonomous vehicle 102 has encountered road construction 106. A human traffic director 108 is directing traffic around the road construction 106. For example, the human traffic director 108 may direct traffic, including the autonomous vehicle 102 over a detour route 109. A vehicle autonomy system 110 within the vehicle 102 may detect that it is unable to successfully navigate the road construction 106 and the human traffic director 108. In response, the vehicle autonomy system 110 contacts an autonomous vehicle operations center 112 via a wireless communications link 114. While the wireless communications link 114 is illustrated as a cellular communications link that includes a cellular tower 116, other embodiments may use other types of wireless communications links, such as those provided via satellite or other communications technologies.

The autonomous vehicle 102 is connected to an operator 120 within the vehicle operations center 112. The operator receives output from and provides input to an operator's console 122. The console 122 is configured to receive input from the operator and provide control signals to the autonomous vehicle 102 based on the input via the communications link 114. The operator is also presented with visual output derived from at least one of the vehicle's 102 sensor's 103. This visual out is presented on an operator display screen 121.

Based on at least observations of the operator display screen 121, the operator 120 provides input via the operator console 122. After receiving control signals that are derived from the operator's input, the autonomous vehicle 102 then proceeds according to those control signals. For example, the input from the operator 120 via the console 122 can cause the autonomous vehicle 102 to follow direction from the human traffic director 108 and, for example, follow the detour route 109 when so directed. After the road construction 106 has been successfully navigated, the operator 120 may provide input to the operator console 122 indicating that the autonomous vehicle 102 is released from manual control. The autonomous vehicle 102 may then continue navigating toward its destination without further operator assistance.

Figure 2:
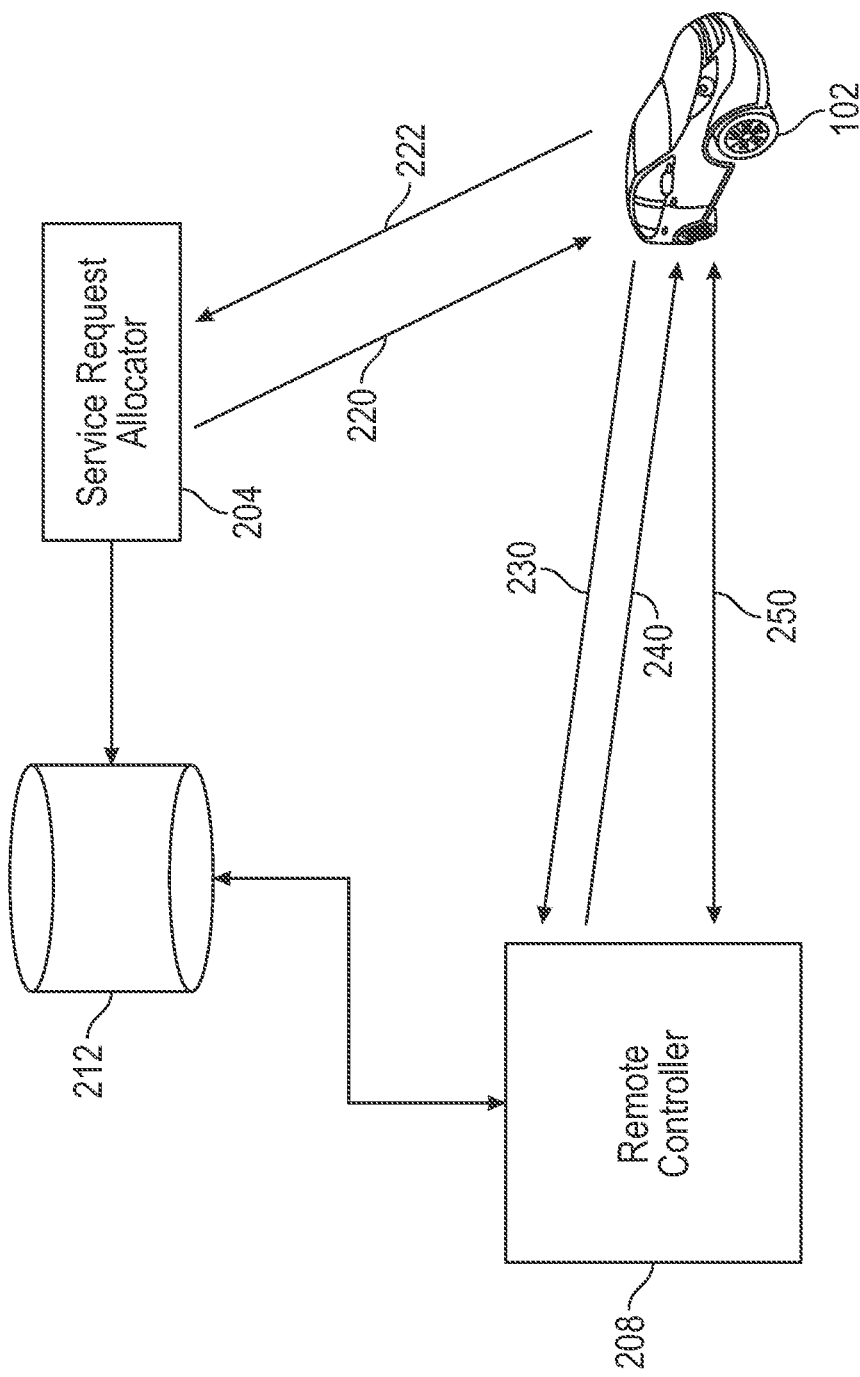
FIG. 2 is a diagram showing an autonomous vehicle in communication with a service request allocator and a remote controller.

FIG. 2 is a diagram showing an autonomous vehicle in communication with a service request allocator and a remote controller. The service request allocator 204 and remote controller 208 may both access a shared data store, such as the data store 212 shown in FIG. 2. The service request allocator 204 may allocate a service request via a service request message 220 to the autonomous vehicle 102. The service request message 220 may specify an origin location and a destination location for a vehicle transportation service. The service request message 220 may also indicate a route the vehicle 102 should take to travel from the origin location to the destination location. The route may indicate one or more waypoints, or intermediate points between the origin location and the destination location. In some aspects, the route may indicate one or more route components of a map that are used to travel from the origin location to the destination location.

The disclosed embodiments may initiate remote operator assistance of an autonomous vehicle under at least two scenarios. In a first scenario, the autonomous vehicle itself may detect a need for remote assistance. For example, as discussed above, a vehicle autonomy system 110 on-board the vehicle may detect conditions that prevent it from successfully (e.g. safely) navigating the autonomous vehicle over a portion of a route to which the autonomous vehicle is assigned or tasked. In response, the vehicle autonomy system 110 may initiate a request for remote assistance.

In some other aspects, instead of the autonomous vehicle determining that operator assistance is needed, the route provided by the service request allocator 204 indicates one or more specific portions of the route that require operator assistance. For example, if the route is indicated as a plurality of route components, the service request message 220 may indicate that one or more particular route components of the plurality of route components require operator assistance. The service request message 220 may indicate that upon reaching the indicated portion of the route, the autonomous vehicle is to contact the remote controller 208.

The vehicle 102 may either accept or reject the service request message 220 via a response message 222. If the vehicle 102 rejects the service request message 220, it does not perform the route, and the service request allocator 204 is configured to identify a different autonomous vehicle to service the route. If the vehicle 102 accepts the service request message 220, then the vehicle 102 will proceed from the source location of the route to the destination location of the route based on the route of travel identified by the service request message 220.

In these embodiments, upon reaching a portion of the route that indicates operator assistance is required, the autonomous vehicle 102 may initiate contact with the remote controller 208 via a remote-control request message 230. In some aspects, as described above, the contact may be initiated when the autonomous vehicle 102 reaches a predetermined location indicated by the route provided in the service request message 220 by the service request allocator 204. For example, a waypoint included in a route may indicate that the autonomous vehicle 102 should contact the remote controller 208 upon reaching a particular waypoint or physical location on the earth indicated in the request message 220.

The remote-control request message 230 requests the remote controller 208 to take some control of the autonomous vehicle 102. The remote controller 208 may then grant or deny the remote-control request message 230 via a remote-control response message 240.

If the remote controller 208 accepts the remote-control request message 230, the remote controller 208 may control the autonomous vehicle 102 via one or more control messages and responses 250.

While FIG. 2 shows communication between the service request allocator, remote controller 208 and the autonomous vehicle 102 via messages, other methods of communication between these components are contemplated. For example, in some other embodiments, shared memory, or remote procedure call type interfaces, or any other type of inter-process communication over a wireless network may be utilized.

Each of the service request allocator 204 and/or remote controller 208 discussed above with respect to FIG. 2 may represent instructions stored in an electronic memory that configure hardware processing circuitry, such as a general purpose hardware processor, to perform one or more of the functions discussed above with respect to each of the service request allocator 204 and/or remote controller 208. In some aspects, each of the service request allocator 204 and/or remote controller 208 may be executed on one or more physically separate hardware devices, such as servers. In some aspects, both the service request allocator 204 and remote controller 208 run on the same physical hardware, and in some aspects, each of the service request allocator 204 and remote controller 208 execute on physically separate hardware devices. In some aspects, one or more of the service request allocator 204 and/or remote controller 208 may run via a cloud-based implementation, which may dynamically allocate hardware as necessary to perform the functions described above (and below) with respect to the service request allocator 204 and/or remote controller 208. Thus, a first function performed by the service request allocator 204 may run on entirely different hardware than a second function of the service request allocator 204 in some aspects.

Figure 3:
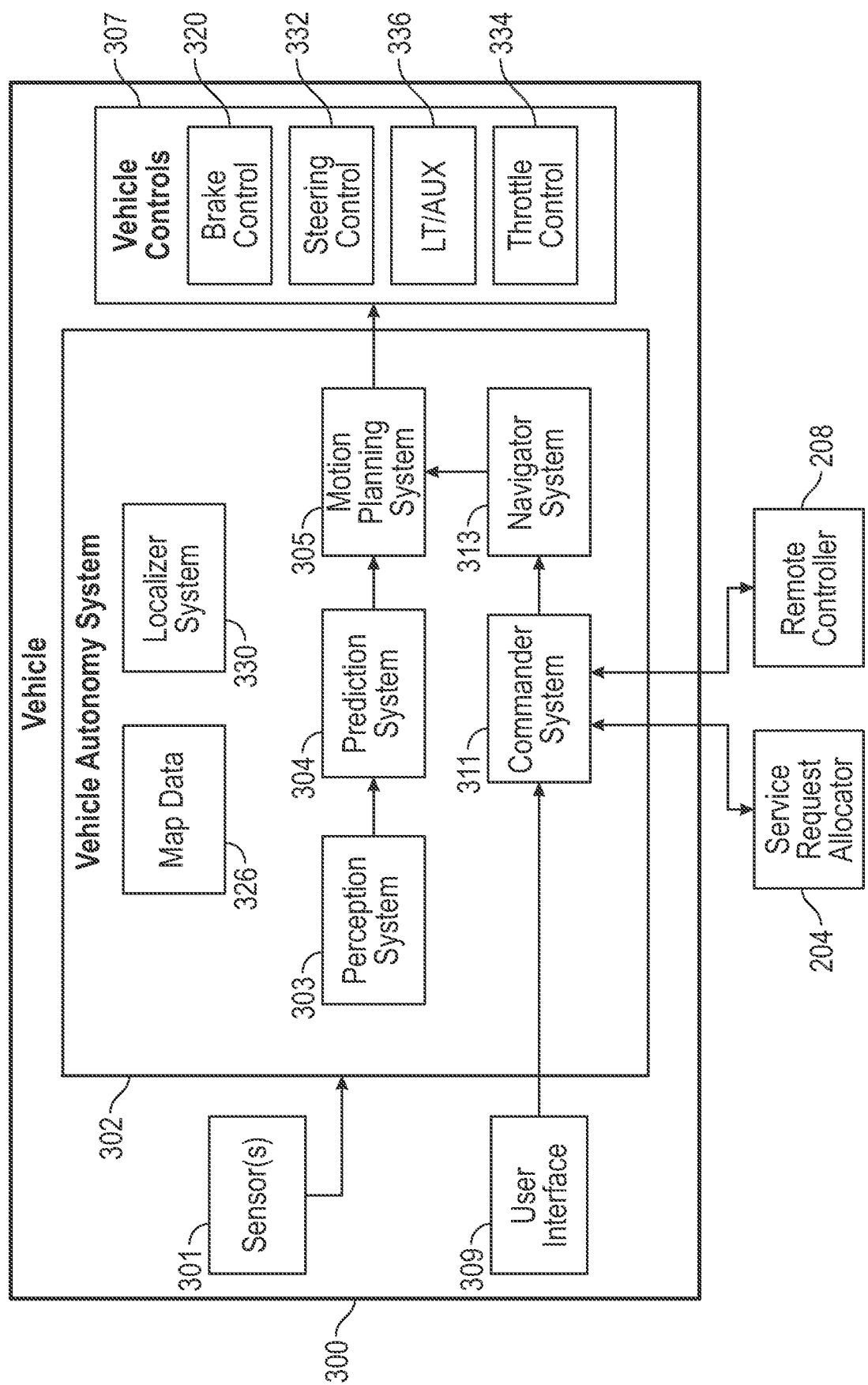
FIG. 3 depicts a block diagram of an example embodiment of the autonomous vehicle according to example aspects of the present disclosure.

FIG. 3 depicts a block diagram of an example embodiment of the autonomous vehicle 102 according to example aspects of the present disclosure. The vehicle 102 includes one or more sensors 301, a vehicle autonomy system 110, and one or more vehicle controls 307. The vehicle 102 is an autonomous vehicle, as described herein. The example vehicle 102 shows just one example arrangement of an autonomous vehicle. In some examples, autonomous vehicles of different types can have different arrangements.

The vehicle autonomy system 110 includes a commander system 311, a navigator system 313, a perception system 303, a prediction system 304, a motion planning system 305, and a localizer system 330 that cooperate to perceive the surrounding environment of the vehicle 102 and determine a motion plan for controlling the motion of the vehicle 102 accordingly.

The vehicle autonomy system 110 is engaged to control the vehicle 102 or to assist in controlling the vehicle 102. In particular, the vehicle autonomy system 110 receives sensor data from the one or more sensors 301, attempts to comprehend the environment surrounding the vehicle 102 by performing various processing techniques on data collected by the sensors 301, and generates an appropriate route through the environment. The vehicle autonomy system 110 sends commands to control the one or more vehicle controls 307 to operate the vehicle 102 according to the route.

Various portions of the vehicle autonomy system 110 receive sensor data from the one or more sensors 301. For example, the sensors 301 may include remote-detection sensors as well as motion sensors such as an inertial measurement unit (IMU), one or more encoders, or one or more odometers. The sensor data includes information that describes the location of objects within the surrounding environment of the vehicle 102, information that describes the motion of the vehicle 102, etc.

The sensors 301 may also include one or more remote-detection sensors or sensor systems, such as a LIDAR, a RADAR, one or more cameras, etc. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 301 may generate sensor data (e.g., remote sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 301 can include a positioning system. The positioning system determines a current position of the vehicle 102. The positioning system can be any device or circuitry for analyzing the position of the vehicle 102. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points) and/or other suitable techniques. The position of the vehicle 102 can be used by various systems of the vehicle autonomy system 110.

Thus, the one or more sensors 301 are used to collect sensor data that includes information that describes the location (e.g., in three-dimensional space relative to the vehicle 102) of points that correspond to objects within the surrounding environment of the vehicle 102. In some implementations, the sensors 301 can be positioned at various different locations on the vehicle 102. As an example, in some implementations, one or more cameras and/or LIDAR sensors can be located in a pod or other structure that is mounted on a roof of the vehicle 102 while one or more RADAR sensors can be located in or behind the front and/or rear bumper(s) or body panel(s) of the vehicle 102. As another example, camera(s) can be located at the front or rear bumper(s) of the vehicle 102. Other locations can be used as well.

The localizer system 330 receives some or all of the sensor data from sensors 301 and generates vehicle poses for the vehicle 102. A vehicle pose describes a position and attitude of the vehicle 102. The vehicle pose (or portions thereof) can be used by various other components of the vehicle autonomy system 110 including, for example, the perception system 303, the prediction system 304, the motion planning system 305 and the navigator system 313.

The position of the vehicle 102 is a point in a three-dimensional space. In some examples, the position is described by values for a set of Cartesian coordinates, although any other suitable coordinate system may be used. The attitude of the vehicle 102 generally describes the way in which the vehicle 102 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote sensor data) to map data 326 describing the surrounding environment of the vehicle 102.

In some examples, the localizer system 330 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 are provided to various other components of the vehicle autonomy system 110. For example, the commander system 311 may utilize a vehicle position to determine whether to respond to a call from the service request allocator 204.

The commander system 311 determines a set of one or more target locations that are used for routing the vehicle 102. The target locations are determined based on user input received via a user interface 309 of the vehicle 102. The user interface 309 may include and/or use any suitable input/output device or devices. In some examples, the commander system 311 determines the one or more target locations considering data received from the service request allocator 204. The service request allocator 204 is programmed to provide instructions to multiple vehicles, for example, as part of a fleet of vehicles for moving passengers and/or cargo. Data from the service request allocator 204 can be provided via a wireless network, for example.

The navigator system 313 receives one or more target locations from the commander system 311 and map data 326. Map data 326, for example, provides detailed information about the surrounding environment of the vehicle 102. Map data 326 provides information regarding identity and location of different roadways and segments of roadways (e.g., lane segments or route components). A roadway is a place where the vehicle 102 can drive and may include, for example, a road, a street, a highway, a lane, a parking lot, or a driveway. Routing graph data is a type of map data 326.

From the one or more target locations and the map data 326, the navigator system 313 generates route data describing a route for the vehicle to take to arrive at the one or more target locations. In some implementations, the navigator system 313 determines route data using one or more path planning algorithms based on costs for route components, as described herein. For example, a cost for a route can indicate a time of travel, risk of danger, or other or other factor associated with adhering to a particular candidate route. For example, the reward can be of a sign opposite to that of cost. Route data describing a route is provided to the motion planning system 305, which commands the vehicle controls 307 to implement the route or route extension, as described herein. The navigator system 313 can generate routes as described herein using a general-purpose routing graph and constraint data. Also, in examples where route data is received from a dispatch system, that route data can also be provided to the motion planning system 305.

The perception system 303 detects objects in the surrounding environment of the vehicle 102 based on sensor data, map data 326, and/or vehicle poses provided by the localizer system 330. For example, map data 326 used by the perception system describes roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 110 in comprehending and perceiving its surrounding environment and its relationship thereto.

In some examples, the perception system 303 determines state data for one or more of the objects in the surrounding environment of the vehicle 102. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 102; minimum path to interaction with the vehicle 102; minimum time duration to interaction with the vehicle 102; and/or other state information.

In some implementations, the perception system 303 determines state data for each object over a number of iterations. In particular, the perception system 303 updates the state data for each object at each iteration. Thus, the perception system 303 detects and tracks objects, such as other vehicles, that are proximate to the vehicle 102 over time.

The prediction system 304 is configured to predict one or more future positions for an object or objects in the environment surrounding the vehicle 102 (e.g., an object or objects detected by the perception system 303). The prediction system 304 generates prediction data associated with one or more of the objects detected by the perception system 303. In some examples, the prediction system 304 generates prediction data describing each of the respective objects detected by the prediction system 304.

Prediction data for an object is indicative of one or more predicted future locations of the object. For example, the prediction system 304 may predict where the object will be located within the next 5 seconds, 20 seconds, 200 seconds, etc. Prediction data for an object may indicate a predicted trajectory (e.g., predicted path) for the object within the surrounding environment of the vehicle 102. For example, the predicted trajectory (e.g., path) can indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 can use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left turn for the vehicle 102 such that the vehicle 102 turns left at the intersection. Similarly, the prediction system 304 determines predicted trajectories for other objects, such as bicycles, pedestrians, parked vehicles, etc. The prediction system 304 provides the predicted trajectories associated with the object (s) to the motion planning system 305.

In some implementations, the prediction system 304 is a goal-oriented prediction system 304 that generates one or more potential goals, selects one or more of the most likely potential goals, and develops one or more trajectories by which the object can achieve the one or more selected goals. For example, the prediction system 304 can include a scenario generation system that generates and/or scores the one or more goals for an object, and a scenario development system that determines the one or more trajectories by which the object can achieve the goals. In some implementations, the prediction system 304 can include a machine-learned goal-scoring model, a machine-learned trajectory development model, and/or other machine-learned models.

The motion planning system 305 commands the vehicle controls based at least in part on the predicted trajectories associated with the objects within the surrounding environment of the vehicle 102, the state data for the objects provided by the perception system 303, vehicle poses provided by the localizer system 330, map data 326, and route or route extension data provided by the navigator system 313. Stated differently, given information about the current locations of objects and/or predicted trajectories of objects within the surrounding environment of the vehicle 102, the motion planning system 305 determines control commands for the vehicle 102 that best navigate the vehicle 102 along the route or route extension relative to the objects at such locations and their predicted trajectories on acceptable roadways.

In some implementations, the motion planning system 305 can also evaluate one or more cost functions and/or one or more reward functions for each of one or more candidate control commands or sets of control commands for the vehicle 102. Thus, given information about the current locations and/or predicted future locations/trajectories of objects, the motion planning system 305 can determine a total cost (e.g., a sum of the cost(s) and/or reward(s) provided by the cost function(s) and/or reward function(s)) of adhering to a particular candidate control command or set of control commands. The motion planning system 305 can select or determine a control command or set of control commands for the vehicle 102 based at least in part on the cost function(s) and the reward function(s). For example, the motion plan that minimizes the total cost can be selected or otherwise determined.

In some implementations, the motion planning system 305 can be configured to iteratively update the route or route extension for the vehicle 102 as new sensor data is obtained from one or more sensors 301. For example, as new sensor data is obtained from one or more sensors 301, the sensor data can be analyzed by the perception system 303, the prediction system 304, and the motion planning system 305 to determine the motion plan.

The motion planning system 305 can provide control commands to one or more vehicle controls 307. For example, the one or more vehicle controls 307 can include throttle systems, brake systems, steering systems, and other control systems, each of which can include various vehicle controls (e.g., actuators or other devices that control gas flow, steering, braking) to control the motion of the vehicle 102. The various vehicle controls 307 can include one or more controllers, control devices, motors, and/or processors.

The motion planning system 305 can provide a signal indicating that manual control of the vehicle 102 is appropriate given current conditions. For example, the motion planning system 305 may evaluate the route to be traveled by the autonomous vehicle 102 and determine that conditions on the route are not suitable for autonomous control of the vehicle 102. For example, the motion planning system 305 may recognize that the route requires the vehicle 102 to make an unprotected left turn, and the vehicle is not configured to make an unprotected left turn, or perhaps an unprotected left turn based on particular measurements from one or more of the sensors 301. In response to a determination that it is not safe or otherwise appropriate for the vehicle to continue under autonomous control, the motion planning system 305 may generate a request for remote control, such as the request described above with respect to FIG. 2. The request may be propagated within the vehicle autonomy system 110 to the commander system 311, which sends the request to the remote controller 208.

The vehicle controls 307 includes a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, brakes the vehicle 102. The secondary system may be configured to determine a failure of the primary system to brake the vehicle 102 in response to receiving the braking command.

A steering control system 332 is configured to receive a steering command and bring about a response in the steering mechanism of the vehicle 102. The steering command is provided to a steering system to provide a steering input to steer the vehicle 102.

A lighting/auxiliary control module 336 receives a lighting or auxiliary command. In response, the lighting/auxiliary control module 336 controls a lighting and/or auxiliary system of the vehicle 102. Controlling a lighting system may include, for example, turning on, turning off, or otherwise modulating headlines, parking lights, running lights, etc.

Controlling an auxiliary system may include, for example, modulating windshield wipers, a defroster, etc.

A throttle control system 334 is configured to receive a throttle command and bring about a response in the engine speed or other throttle mechanism of the vehicle. For example, the throttle control system 334 can instruct an engine and/or engine controller, or other propulsion system component to control the engine or other propulsion system of the vehicle 102 to accelerate, decelerate, or remain at its current speed.

Each of the perception system 303, the prediction system 304, the motion planning system 305, the commander system 311, the navigator system 313, and the localizer system 330, can be included in or otherwise be a part of a vehicle autonomy system 110 configured to control the vehicle 102 based at least in part on data obtained from one or more sensors 301. For example, data obtained by one or more sensors 301 can be analyzed by each of the perception system 303, the prediction system 304, and the motion planning system 305 in a consecutive fashion in order to control the vehicle 102. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The commander system 311 may also receive input from the remote controller 208. The remote controller 208 may provide input commanding the vehicle 102 to perform one or more operations, such as move forward, move backward, turn to a particular heading or turn to an offset from a present heading, brake, slow down, accelerate, or other commands, as discussed further below.

The vehicle autonomy system 110 includes one or more computing devices, which may implement all or parts of the perception system 303, the prediction system 304, the motion planning system 305 and/or the localizer system 330. Descriptions of hardware and software configurations for computing devices to implement the vehicle autonomy system 110 are provided herein at FIGS. 13 and 14.

Figure 4:
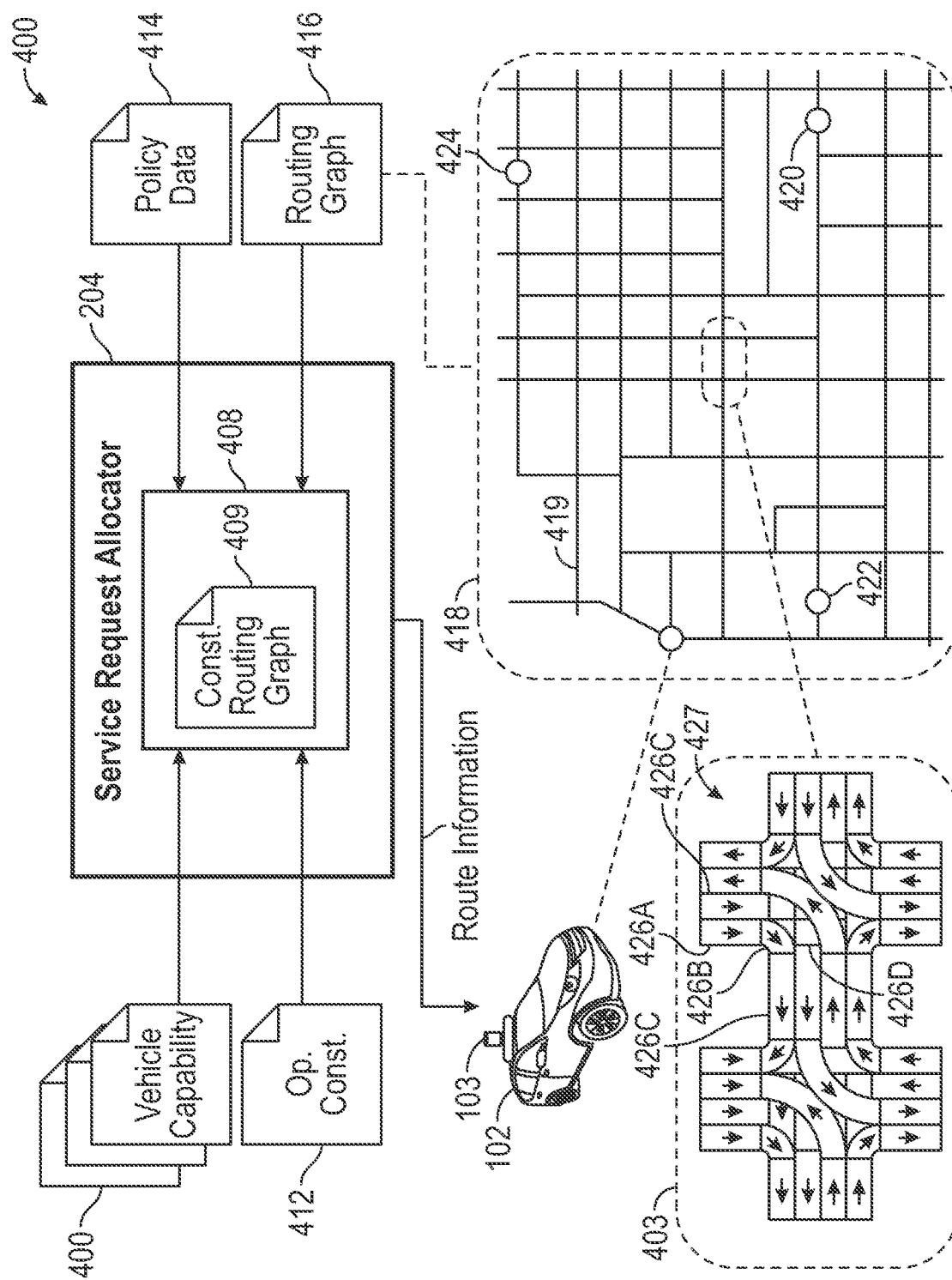
FIG. 4 is an expanded view of the service request allocator.

FIG. 4 is an expanded view of the service request allocator 204. The service request allocator 204 can generate routes utilizing, for example, a routing graph 416 in conjunction with constraint data such as, for example, policy data 414, vehicle capability data 410, and/or operational constraint data 412. The service request allocator 404 accesses the routing graph 416 and/or constraint data in any suitable manner. In some examples, the routing graph 416 and/or constraint data is stored at a data storage device associated with the service request allocator 404. Also, in some examples, the routing graph 416 and/or constraint data can be received from another origin or system. For example, vehicle capability data 410 can be, or be derived from, operational domain (OD) data provided by the manufacturer of the vehicle or of its vehicle autonomy system.

FIG. 4 shows a graphical representation 418 including a portion of the routing graph 416. The representation 418 shows various interconnected roadways 419. The roadways are made up of route components. The routing graph 416 can also include directionality data indicating the direction of the various route components and connectivity data indicating possible transitions between the route components.

Example route components are shown in a break-out window 403 to illustrate additional details of the example routing graph 416. Route components in the break-out window 403 are illustrated as shapes with arrows indicating the directionality of the route components. Route components can be connected to one another according to their directionality. For example, a vehicle can approach the intersection 427 by traversing example route component 426A. From the route component 426A, the vehicle can transition to example route component 426D to proceed straight through the intersection 427. The vehicle can also transition to the route component 426B to turn right at the intersection 427. In some examples, the vehicle can also change lanes by transitioning from the route component 426A to route component 426C.

The service request allocator 404 is configured to utilize the constraint data, such as policy data 414, operational constraint data 412, and/or vehicle capability data 410, to generate constrained routing graph data 409. The constrained routing graph data 409 is used to generate a route. Generally, constraint data for a particular constraint includes a constraint property or set of constraint properties of route components subject to the constraint and one or more routing graph modifications for implementing the constraint. Routing graph modifications can include, for example, removing route components having the indicated property or properties from the routing graph, removing connections to route components having the indicated property or properties from the routing graph, and/or changing a cost of route components having the indicated property or properties. Another example routing graph modification can include changing a cost associated with route component and/or transitions to the route component.

Costs may be changed up or down. For example, if constraint data indicates that route components having a particular property or set of properties are disfavored, the costs to traverse and/or transition to the route components can be increased. On the other hand, if constraint data indicates that route components having a particular property or set of properties are favored, the costs to traverse and/or transition to the route components can be decreased.

Routing graph modifications can relate to route components that have the indicated constraint property or properties. For example, if a policy constraint forbids routing a vehicle through route components that include or are in a school zone, a corresponding routing graph modification includes removing such school zone route components from the routing graph 416 and/or removing transitions to such school zone route components. Routing graph modifications can, in some examples, describe changes to route components other than those having the identified properties. Consider an example constraint that is to avoid cul-de-sacs. The associated routing graph modification could involve removing route components that include cul-de-sacs and also removing route components that do not include cul-de-sacs but can lead only to other route components that include cul-de-sacs.

Policy data 414 can describe policy constraints including, for example, route component properties that identify route components subject to a policy constraint and corresponding routing graph modifications. Policy constraints refer to types of route segments that it is desirable for a vehicle to avoid or prioritize. An example policy constraint is to avoid route components that are in or pass through school zones. Another example policy constraint is to avoid routing vehicles in residential neighborhoods. Yet another example policy constraint is to favor routing vehicles on controlled-access highways, if available. Policy constraints can apply to some vehicles, some vehicle types, all vehicles, or all vehicle types.

Vehicle capability data 410 describes capability constraints associated with various vehicles of different types.

For example, the service request allocator 204 can be programmed to generate routes for autonomous vehicles such as autonomous vehicle 102 having different types of vehicle autonomy systems, different types of sensors, different software versions, or other variations. Vehicles of different types can have different capabilities. For example, a vehicle of one type may be capable of making all legal unprotected lefts. A vehicle of another type may be incapable of making unprotected lefts, or capable of making unprotected lefts only if oncoming traffic is traveling less than a threshold speed. In another example, one type of vehicle may be capable of traveling on controlled-access highways while another type of vehicle may be capable of traveling only on roadways with a speed limit that is less than 45 miles per hour.

The vehicle capability data 410 includes constraint data identifying a route segment property or properties (e.g., includes an unprotected left, is part of a controlled access highway, etc.) and routing graph modification data indicating what is to be done to route components having the indicated property or properties. For example, route components that a particular vehicle type is not capable of traversing can be removed from the routing graph or can have connectivity data modified to remove transitions to those route components. If the route component properties indicate a maneuver that is undesirable for a vehicle, but not forbidden, then the routing graph modification data can call for increasing the cost of an identified route component or transitions thereto.

Operational constraint data 412 describes operational constraints, for example, with sets of route component properties and associated routing graph modifications. Operational constraints can be based, for example, on the state of one or more roadways. For example, if a roadway is to be closed for a parade or for construction, an operational constraint can identify properties (e.g., names or locations) of route segments that are part of the closure and an associated routing graph modification (e.g., removing the route components, removing transitions to the route components, etc.).

As described the service request allocator 204 applies constraint data, such as policy data, 414, operational constraint data 412, and vehicle capability data 410 to the routing graph 416 to generate a constrained routing graph 409. The constrained routing graph 409 is used to generate a route for a vehicle 102. The routing engine 406, in some examples, generates the constrained routing graph 409 at different times during route generation. In some examples, the routing engine 408 receives a request to generate a route for a particular vehicle 102. The service request allocator 404 responds by accessing the current constraint data for the vehicle 102. The service request allocator 204 applies the constraint data to the routing graph 416 to generate the constrained routing graph 409 and then uses the constrained routing graph 409 to generate a route.

In another example, the service request allocator 204 generates the constrained routing graph 409 on an as-needed basis. For example, various path planning algorithms described herein operate using graph expansion. To apply a graph expansion-type algorithm, the routing engine 408 begins at an algorithm start point and expands along allowable transitions to string together connected route components. The algorithm is complete when one or more of the strings of connected route components has an allowable transition to or from an algorithm end point. Many graph expansion algorithms can be applied forwards (e.g., from a vehicle start point to a vehicle end point) or backwards (e.g., from a vehicle end point to a vehicle start point).

To generate a constrained routing graph 409 on an as-needed basis, the routing engine 408 can request a subset of the constrained routing graph 409 while route expansion is being performed. For example, the routing engine 408 can determine a first portion of a route including a string of connected route components. The routing engine 408 can then request constrained routing graph 409 data describing a set of route components that can be transitioned to the last route component of the string (or a set of route components from which a vehicle can transition to the last route component of the string if the algorithm is applied backwards). In this way, the routing engine 408 may not need to apply the constraint data to all route components of the grouting graph 416 but, instead, only to the route components used by the path planning algorithm.

In some embodiments, the routing engine 408 may determine that one or more route components of a route have a cost associated with autonomous vehicle operation that is higher than a predetermined threshold or meets one or more predetermined criterion. For example, the routing engine 408 may determine that a route component includes a feature that prevents autonomous operation, at least for some types of autonomous vehicles. Features such as unprotected left turns, detours, road construction, poorly marked lanes, or other road features may prevent autonomous operations for at least some vehicle types. In response to such a determination, the routing engine 408 may mark the route component as requiring remote control to navigate the route component. When a route is provided to an autonomous vehicle for execution, the autonomous vehicle may allow for its remote control upon reaching a location proximate to the route component, as further described below.

FIG. 5 includes two example embodiments of a remote controller 208. These two embodiments are shown as remote controller 208a and remote controller 208b. Also shown in FIG. 5 is an autonomous vehicle 102 and a motion vector of the autonomous vehicle 550. The motion vector 550 is shown as a point, indicating that the autonomous vehicle is not moving. Also shown are four other motion vectors 550a-d that represent a change of motion relative to the motion vector 550. Each of the five motion vectors 550 and 550a-d represent different directions and speeds of motion of the autonomous vehicle 102. In particular, motion vector 550a shows a motion vector representing forward motion of the autonomous vehicle 102, while motion vector 550b represents an increased speed of forward motion of the autonomous vehicle 102 relative to the motion vector 550a. Motion vector 550c represents reverse motion of the autonomous vehicle 102, and motion vector 550d represents increased speed of reverse motion of the autonomous vehicle 102 relative to motion vector 550c.

The remote controller 208a includes a joystick control 502 and joystick interface 504 connecting to the remote controller 208a. The remote controller 208a receives commands for the autonomous vehicle 102 via joystick control 502.

The remote controller 208a is configured to instruct the autonomous vehicle 102 to increase its motion vector 550 in a forward direction 522 when the joystick control 502 is positioned in a forward direction 511. The remote controller 208a is configured to instruct the autonomous vehicle 102 to increase its motion vector 550 in a rearward direction 524 when the joystick control 502 is positioned in a rearward direction 513. A speed of the autonomous vehicle (size of the motion vector 550 in the forward direction 522) may be determined based on how far forward the joystick control 502 is positioned in the forward direction 511. In other words, a length or size of the autonomous vehicles motion vector 550 may be increased in proportion to how far in the direction 511 the joystick is positioned. Example motion vectors that may result from moving the joystick control 502 in the forward direction 511 are shown by motion vectors 550*a* and 550*b*, with motion vector 550*b* representing faster motion than motion vector 550*a*.

Moving the joystick control 502 in a rearward direction 513 instructs the autonomous vehicle to decrease its motion vector 550 in the forward direction 522. If the motion vector 550 reaches a zero value and the joystick remains in the direction 513, the motion vector 550 may represent a negative value, as shown for example by the example motion vectors 520*c-d*.

The remote controller 208*a* receives input from the joystick control 502 and determines a steering position, brake position, and accelerator position based on a position of the joystick control 502. These determined positions may then be transmitted to the autonomous vehicle 102 to control a direction and/or speed of the autonomous vehicle in some embodiments.

The remote controller 208*b* is connected to a steering wheel 510 via a steering wheel controller 512, a brake pedal 520 via a brake controller 523, and an accelerator pedal 530 via an accelerator controller 532.

Each of the steering wheel controller 512, brake controller 523, and accelerator controller 532 are configured to send control signals to the remote controller 208 based on input received from the steering wheel 510, brake pedal 520, and accelerator pedal 530. These control signals may indicate positions of the steering wheel 510, brake pedal 520 and/or accelerator pedal 530.

FIG. 5 also shows the remote controller 208*b* may include a hardware processor 560*b* and an input/output (I/O) controller 565*b*. The I/O controller 565*b* may receive signals from one or more of the steering wheel controller 512, brake controller 523, and/or accelerator controller 532, process the signals, and provide additional signals to the hardware processor 560*b*. Some embodiments may omit the I/O controller 565*b* and interface the hardware processor 560*b* directly with each of the steering wheel controller 512, brake controller 523, and accelerator controller 532. Each of the controllers 512, 523, and 532 may include electronic processing circuitry and/or memory to perform their respective functions discussed above.

FIG. 6 is a block diagram showing example data structures that may be implemented in one or more of the disclosed embodiments. While the data structures discussed below with respect to FIG. 6 are presented as relational database tables, one of skill in the art would understand that the data structures could be implemented using a variety of different structures, including linked lists, unstructured data stores, tagged data, trees, or other structures as appropriate. One or more of the data structures discussed below with respect to FIG. 6 may be included in the data store 212, discussed above with respect to FIG. 2.

FIG. 6 shows a route component table 610, route info table 650, and a route segment table 660. The route table 610 includes a route component identifier 612, segment position information 614, route component type indicator 616 and segment connection point information 619.

The route table 610 defines components of a map that may be used for navigation and routing of autonomous vehicles in one or more of the disclosed embodiments. The route component identifier 612 uniquely identifies a route component. The segment position info 614 describes a position on the earth of the route component. For example, the segment position info may define two or more points on the earth bordering the route component. The segment position info 614 may define boundaries of the route component identified by the route component identifier 612. The segment position info may define a first endpoint of the segment and/or a second endpoint for the segment. The route component type indicator 616 identifies a type of the route component. The route component type 616 may identify, for example, whether the route component is a road segment, an intersection segment, a water segment, an on-ramp segment, or other type of segment. The segment connection point information 619 defines other route components to which the identified route component is connected, and at what point in the route component these connections occur. For example, the segment connection point information 619 may define one or more pairs of information including a connecting route component identifier, and connection points on the identified route component (e.g. 612) to the connecting route component identifier.

The route info table 650 defines information for a route. The route identifier field 652 uniquely identifies a particular route. The origin location field 654 defines an origin location of the route. The destination location field 656 defines a destination location for the route.

The route segment table 660 includes a route identifier field 662, route segment identifier field 664, route sequence number field 666, and a remote-control request field 668. The route identifier field 662 uniquely identifies a particular route and may be cross referenced with the route identifier field 652. The route segment identifier field 664 identifies a route component in the route component table 610 and may be cross referenced with route component identifier field 612. The route sequence number field 666 defines an order of the particular route component identified by the route segment identifier field 664 within a particular route (i.e. the route having the unique route identifier defined by the route identifier field 662). Thus, for example, in some embodiments, a route component within a route having a sequence number of two (2) is traveled after a route component within the route having a sequence number of one (1).

FIG. 7 is a flowchart showing one example of a process flow 700 that can be executed by the service request allocator 204 in some embodiments. One or more of the functions discussed below may be performed by hardware processing circuitry. For example, instructions (e.g. 1524 discussed below) stored in an electronic memory (e.g. 1504 and/or 1506 discussed below) may, when executed, configure the hardware processing circuitry (e.g. 1502 discussed below) to perform one or more of the functions discussed below with respect to FIG. 7.

In operation 710, an autonomous vehicle is requested to execute a route. In some aspects, the service request allocator 204 may receive a request from a passenger for a transportation service from an origin location to a destination location. The service request allocator 204 may then determine an appropriate autonomous vehicle to execute the transportation service and send a message to the selected autonomous vehicle requesting the autonomous vehicle to perform the transportation service, for example, as illustrated in FIG. 2 with respect to the service request message 220.

In operation 712, an indication of an acceptance of the route is received from the autonomous vehicle. For example, as discussed above with respect to FIG. 2, the autonomous vehicle 102 may respond to the service request message 220 with a response message 222, indicating whether the vehicle accepts or declines the request to perform the transportation service.

In operation 715, a request for remote control is received from the autonomous vehicle. In some aspects, the request for remote control is received by the service request allocator 204. In some other aspects, the request for remote control may be received by the remote controller 208. Other embodiments may provide for alternative approaches to an autonomous vehicle requesting remote control. The request for remote control may include additional information, such as a reason code that indicates a reason remote control is requested, an indication of a current location of the autonomous vehicle, identification information for the autonomous vehicle, and/or additional state information for the autonomous vehicle (e.g. speed, direction, elevation, fuel/battery level, or other indications of vehicle state). In some embodiments, the request for remote control may further include or indicate an image or video from a front facing camera of the autonomous vehicle. In some embodiments, the remote controller 208 is configured to display the image or video to a remote operator. The image or video can provide the remote operator an indication of why the remote-control request was initiated by the autonomous vehicle.

In operation 718, a command is provided to the autonomous vehicle in response to the request for remote control. The command indicating a change in a vehicle control setting. For example, unlike the request to execute a route provided to the vehicle in operation 710, the command provided to the autonomous vehicle in operation 718 indicates a particular change in a vehicle control setting, such as a steering position setting, brake setting, acceleration setting, or other control setting. In some aspects, the command may indicate a change in a motion vector of the vehicle. For example, the command may indicate an increase or decrease of a motion vector representing forward direction of the vehicle. Alternatively, the command may indicate a change in direction of the motion vector. In some aspects, the command may be provided in response to input being received from a remote controller, such as either of the remote controllers 208a or 208b discussed above with respect to FIG. 5. In some embodiments, the command takes the form of a message passed from the remote controller 208 to the autonomous vehicle 102. For example, the message includes, in some embodiments, one or more fields indicating one or more of a steering position setting, a brake setting, an acceleration setting, or other control setting. The command message also includes a field, in some embodiments, indicating that it is a command message. In some aspects, the remote controller 208 invokes an API of the vehicle 102. In these embodiments, the fields of the message discussed above may instead be represented by parameter values provided to the API.

FIG. 8 is a flowchart showing one example of a process flow 800 that can be executed by an autonomous vehicle 102 in some embodiments. One or more of the functions discussed below may be performed by hardware processing circuitry. For example, instructions (e.g. 1524 discussed below) stored in an electronic memory may, when executed, configure the hardware processing circuitry (e.g. 1502 discussed below) to perform one or more of the functions discussed below with respect to FIG. 8.

In operation 810, a request is received to execute a route from a requester. For example, as discussed above with respect to FIG. 2, the service request allocator 204 (e.g. requester) may send a service request message 220 to an autonomous vehicle 102, requesting the autonomous vehicle 102 to execute a route. The request received in operation 810 may include one or more of the fields discussed below with respect to the service request message of FIG. 10.

In operation 812, the service request received in operation 810 is accepted. Accepting the request may include transmitting a message (e.g. 222) indicating an acceptance of the request back to the requester. For example, in some aspects, the requester may be the service request allocator 204.

Operation 815 detects that a route condition of the route meets a criterion. The route condition may include a weather condition (e.g. rain, snow, fog), road condition (e.g. road surface, markings, signage, obstructions) traffic condition (e.g. accident, congestion), vehicle condition (e.g. mechanical issue), or other condition. In some aspects, operation 815 may detect that conditions along the accepted route are such that the autonomous vehicle cannot safely or with a threshold level of confidence navigate through the conditions. For example, in some aspects, operation 815 may determine that visibility available to sensors included on the autonomous vehicle is inadequate to provide for successful autonomous operation. This could be the result of, for example, weather conditions, such as snow, fog, or heavy rain that prevent the sensors from obtaining sensing data necessary for successful autonomous operation.

In operation 818, a request for remote assistance is generated based on the criterion being met. In some aspects, the request is generated to further indicate the conditions that met the criterion. The request may be further generated to indicate a present location of the autonomous vehicle. In some aspects, the request may be further generated to indicate a priority of the request. For example, if the autonomous vehicle determines there is a level of urgency to the remote-control request above a threshold value, the priority may be set to a first value and otherwise set to a second value. In some aspects, the urgency may be determined based on a variety of factors. For example, in some aspects, one or more sensors (e.g. 301) located on the autonomous vehicle may detect a signal person (e.g. 108). Detection of the signal person may increase the urgency relative to a situation without a signal person. In some aspects, one or more sensors (e.g. 301) may detect vehicles behind the autonomous vehicle. This may also increase the urgency relative to a situation where no vehicles are detected behind the vehicle. The vehicle may, in some aspects, detect whether the autonomous vehicle is positioned within a lane or travel, or is positioned, for example, on a shoulder or off the road such that the vehicle is not within a lane of travel and thus does not represent an obstruction to traffic. The urgency may be set, at least in part, on the position of the vehicle relative to the lane of travel in some embodiments. In some aspects, the remote-control request generated in operation 818 may include one or more of the fields discussed below with respect to the example remote control request 1100 of FIG. 11.

In operation 820, a vehicle control command is received. The vehicle control command indicates a setting for one or more vehicle control parameters. For example, the vehicle control command may include any combination of settings illustrated in the vehicle control message 900, discussed below with respect to FIG. 9.

In operation 822, the command received in operation 820 is executed. For example, if the command indicates a throttle position, the autonomous vehicle's throttle position is set consistent with that indicated by the command. If the command indicates a steering position, the autonomous vehicle's steering is positioned consistent with the command. If the command indicates a brake position, the autonomous vehicle's braking system is set consistent with the command. In some aspects, the vehicle control command may not indicate specific control settings, but may instead indicate a higher level of control, such as a speed to maintain, or a new geographic location the autonomous vehicle is to navigate to. The geographic location may be within a threshold distance of a present location of the autonomous vehicle. The relatively small distance may ensure that autonomously navigating to the new geographic location (e.g. 20 feet ahead and to the right) is within a threshold margin of confidence.

FIG. 9 is an example message format for a vehicle control message. The vehicle control message 900 may be generated by the remote controller 208 in some embodiments and transmitted to an autonomous vehicle 102 in one or more of the disclosed embodiments. In some embodiments, the message 900 discussed below is received in operation 820, discussed above. In some embodiments, the message 900 is transmitted by the remote controller 208 to an autonomous vehicle 102 in operation 718, discussed above with respect to FIG. 7.

The message 900 includes a message identifier field 902, throttle position field 904, brake position field 906, steering position field 908, turn signal setting field 910, horn control field 912, and exterior lights setting field 914. The message identifier field 902 may identify the message 900 as a vehicle control message. For example, the message identifier field 902 may be set to a predetermined value to indicate the message 900 is a vehicle control message including one or more of the further fields of the message 900. The throttle position field 904 indicates a throttle position setting to be achieved upon reception of the message 900 by an autonomous vehicle. In some aspects, the throttle position field 904 may define a throttle position for a period of time, and/or a target speed. Upon reaching the target speed, a different (e.g. default) throttle position may be set by the autonomous vehicle. The brake position field 906 indicates a brake position to be achieved by an autonomous vehicle upon receiving the message 900. In some aspects, the brake position field 906 may further indicate a time period when the indicated brake position is set, and/or a target speed. Upon reaching the target speed, a different brake position (e.g. a default brake position) may be set. The steering position field 908 indicates a steering position to be achieved by an autonomous vehicle upon receiving the message 900. The turn signal setting field 910 indicates whether a turn signal of the autonomous vehicle should indicate a left turn, right turn, or be in an off position. The horn control field 912 indicates whether a horn of the autonomous vehicle is to be in an activated position or an off position. The horn control field 912 may also include an elapsed time for the horn to be in the activated position if so indicated. The exterior lights setting field 914 indicates setting for one or more exterior vehicle lights such any combination of low beam headlights, high beam headlights, parking lights, and/or fog lights. In some aspects, an autonomous vehicle may be configured to come to a stopped position in response to a failure to receive a vehicle control message (e.g. 900) within a predetermined period of time. This may prevent problems with network connectivity causing controllability problems for an autonomous vehicle under remote control.

FIG. 10 shows an example format for a service request message. The service request message 1000 shown in FIG. 10 includes a message identifier field 1001, and origin location field 1002, destination location field 1003, and a number of segments field 1004. The message identifier field 1001 identifies the message 1000 as a service request message. For example, the message identifier field 1001 may be set to a predetermined value to indicate the message 1000 is a service request message. The origin location field 1002 and destination location field 1003 indicate an origin and destination respectively of the route defined by the message 1000. In various embodiments, the origin and destination may be indicated via geographic or geodetic coordinates, or other means.

The number of segments field 1004 defines a number of segments included in a route that is defined by the service request message 1000. Following the number of segments field 1004 are pairs of route component id fields $1006_{1 \ldots N}$ and remote-control flag fields $1008_{1 \ldots N}$, where N is consistent with a value included in the number of segments field 1004. The segments identified in the service request message 1000 identify route components in a route component table or database (e.g. 610), accessible to an autonomous vehicle and/or the service request allocator 204. Each of the remote-control flag fields $1008_{1 \ldots N}$ indicate whether an autonomous vehicle executing the route defined by the service request message 1000 is to request remote control for execution of the particular route component associated with the particular remote-control flag. In some aspects, the service request message 220, discussed above with respect to FIG. 2, may include one or more of the fields illustrated in FIG. 10.

FIG. 11 shows an example format of a remote-control request message. One or more of the fields discussed below with respect to the remote-control request message 1100 of FIG. 11 may be included in the remote-control request message 230, discussed above with respect to FIG. 2.

The remote-control request message 1100 includes a message identifier 1002, reason code 1104, current location 1106, and sensor data 1108. The message identifier 1102 identifies the message 1100 as a remote-control request message. For example, the message identifier 1102 may be set to a predetermined value to indicate the message 1100 is a remote-control request message. The reason code 1104 indicates a reason why an autonomous vehicle is requesting remote control. For example, the reason code 1104 may be set to a predetermined value indicating one of a variety of reasons for requesting remote control, such as the autonomous vehicle has reached a route segment defined in a service request message that requires remote control (e.g. via field 1008), the autonomous vehicle has a mechanical problem (e.g. sensor off line), the autonomous vehicle's vehicle autonomy system (e.g. 110) has determined a confidence value for motion planning below a threshold, or other reasons). The current location field 1106 indicates a current location of the autonomous vehicle requesting remote control. In some aspects, the current location may be represented in geographic coordinates (e.g. lat/long) and/or a route component identifier. The sensor data field 1108 may indicate one or more data collected from sensor(s) on board the autonomous vehicle. For example, the sensor data field 1108 may indicate data received from a LIDAR sensor, visual camera, distance sensor(s), or other on-board sensors.

FIG. 12 is a flowchart showing one example of a process flow 1200, all or portions of which may be executed by the service request allocator 204 and/or remote controller 208 in some embodiments. One or more of the functions discussed below may be performed by hardware processing circuitry. For example, instructions (e.g. 1524 discussed below) stored in an electronic memory (e.g. 1524 discussed below) may, when executed, configure the hardware processing circuitry (e.g. 1502 discussed below) to perform one or more of the functions discussed below with respect to FIG. 12.

In operation 1210, a route portion that requires remote assistance is identified. As discussed above, in some aspects, the routing engine 408 discussed above may determine a cost associated with traversing a route component exceeds a predetermined threshold or otherwise meets one or more predetermined criterion. In response, operation 1210 may mark or otherwise indicate that the route portion (such as a route component or route segment) requires remote assistance for successful navigation.

In some aspects, operation 1210 includes receiving a transportation service request for transportation from an origin location to a destination location. For example, a mobile device may receive input indicating the destination location and transmit its current location (obtained via an integrated positioning receiver, such as a GPS receiver) and the destination location to (either directly or indirectly) the service request allocator 204. A route between the origin location and destination location may be determined, with the route including a plurality of route segments. One or more of the route segments may meet a criterion indicating that remote assistance is necessary. In other words, one or more of the route segments may be determined to be not appropriate for autonomous navigation. In some aspects, this determination is based on a type of autonomous vehicle to which the route will be assigned. For example, a first type of autonomous vehicle may be capable of navigating unprotected left turns while a second type of autonomous vehicle may not be capable of autonomously navigating unprotected left turns.

In operation 1212, a route is generated to include the route portion. For example, generating the route may include generating data indicating a plurality of route segments that are included in the route, and how the route segments are connected between the origin location and the destination location of the route (e.g. via the route segment identifier 664, and route sequence number 666 shown above with respect to FIG. 6).

Operation 1215 requests an autonomous vehicle to execute the route. For example, as discussed above with respect to FIG. 2, the service request allocator 204 may send a service request message 220 to an autonomous vehicle, requesting the vehicle to execute the route. In some aspects, the service request message 220 may include data indicating the generated route.

In operation 1218, an indication of acceptance of the route is received from the autonomous vehicle. For example, as discussed above with respect to FIG. 2, the vehicle 102 may transmit a message 222 to the service request allocator 204, the message 222 indicating acceptance of the service request message 220.

In operation 1220, an indication that the autonomous vehicle is within a proximity of the route portion is received. For example, in some aspects, the autonomous vehicle may transmit a remote-control request message to 230 to the remote controller 208 upon moving within a predetermined threshold distance of the route portion identified in operation 1210.

In operation 1222, remote assistance is provided to the autonomous vehicle in response to the indication. As discussed above, in some aspects, the remote assistance is provided via an operator console, such as the operator console 122 discussed above with respect to FIG. 1. Remote assistance may be based on input received from one or more of the joystick controller 502, steering wheel controller 512, brake controller 523, and/or accelerator controller 532. In some aspects, operation 1222 includes sending a message to the autonomous vehicle including one or more of the fields of message 900, discussed above. Values in the one or more fields may be based on the operator console input.

In some other embodiments, remote assistance is provided to the autonomous vehicle via selection of a new motion plan. For example, in some embodiments, the autonomous vehicle presents, via the operator console, a plurality of different motion plans that are available to the autonomous vehicle. The human operator then selects one of the presented plans for execution by the AV. This selection is provided to the AV in operation 1222. The AV then executes the selected motion plan.

In some embodiments, remote assistance is provided to the AV by modification of a waypoint in an existing motion plan or route of the AV. In some embodiments, remote assistance is provided via modification of a label of an object. For example, in some embodiments the perception system 303 objects with a type. For example, an object is labeled as a pedestrian or a paper bag, or other type of object. The labeling of the object can affect a motion plan of the vehicle. For example, the vehicle is permitted, in some embodiments, to run over a paper bag while pedestrians are avoided under all circumstances. In some cases, a paper bag is mislabeled as a pedestrian. Thus, to support resolution of vehicle operation challenges resulting from incorrectly labeled objects, operation 1222 provides for manual override or manual labeling of object labels. After an object is relabeled via remote assistance, a motion plan of the autonomous vehicle is adjusted based on the relabeling.

FIG. 13 is a flowchart showing one example of a process 1300, all or portions of which may be executed by the autonomous vehicle 102 in some aspects. One or more of the functions discussed below may be performed by hardware processing circuitry. For example, instructions (e.g. 1524 discussed below with respect to FIG. 15) stored in an electronic memory e.g. 1504 and/or 1506 discussed below with respect to FIG. 15) may, when executed, configure the hardware processing circuitry (e.g. 1502 discussed below with respect to FIG. 15) to perform one or more of the functions discussed below with respect to FIG. 13.

In operation 1310, a service request for a route is received. In some aspects, the service request may be received as a message including one or more of the fields discussed above with respect to FIG. 10. The service request received in operation 1310 indicates a route (for example, in some aspects, in the manner described above with respect to FIG. 10), and one portion of the route indicates that remote assistance is required to complete the portion (e.g. again as described above with respect to FIG. 10 in some aspects).

In operation 1312, the service request is accepted. In some aspects, accepting the service request may include responding to the service request received in operation 1310, with the response indicating the acceptance via a predetermined value. In embodiments that provide the service request via a message such as that described above with respect to FIG. 10, accepting the service request may include transmitting a message to the entity generating the service request (e.g. the service request allocator 204 in some aspects).

In operation 1315, a second portion of the route is executed autonomously. The second portion of the route is positioned prior to the portion indicating remote assistance is required. For example, the second portion may be between an origin location of the route and a waypoint or beginning point of the first portion. For example, in some aspects implementing a format similar to that of the message 1000 discussed above with respect to FIG. 10, the second portion may be indicated later subsequent in the message 1000 to the first portion. In implementations that explicitly indicate an order of route segments, such as that illustrated with respect to a route sequence number (e.g. 666) of the route info table 650, the second portion may precede the first portion in the order (e.g. In some aspects, have a lower value in the route sequence number field 666 than the first portion).

In operation 1318, an indication is transmitted by the autonomous vehicle that it is proximate to the first portion. The transmission may be in response to the vehicle coming within a predetermined threshold distance from a waypoint or other key point location of the first portion. For example, in implementations that include map structures similar to those described above with respect to the route component table 610, the segment position info 614 may define a geographic location of the first portion on the planet earth. In some aspects, when the autonomous vehicle comes within a predetermined threshold distance of any point on the earth included in the route component, the indication may be transmitted. In some aspects, the transmitted indication may include one or more fields of the remote-control request 1100, discussed above with respect to FIG. 11.

In operation 1320, a vehicle command is accepted in response to the transmitted indication. For example, operation 1318 may include placing the autonomous vehicle into a mode in which it will accept remote control commands from, for example, the remote controller 208. In some aspects, the remote controller 208 may send a remote-control message including one or more of the fields discussed above with respect to the vehicle control message 900. This message may be received by the autonomous vehicle performing the process 1300 (e.g. as illustrated by control messages and responses 250 discussed above with respect to FIG. 2).

In some embodiments, operation 1320 includes accepting a command that modifies a motion plan of the vehicle. The modification of the motion plan is provided, in some embodiments by a command that defines a new path along a current route. For example, the new path, in some circumstances allows the vehicle to circumnavigate an obstruction or other problem with an existing route that prevents autonomous operation.

In some embodiments, the command modifies a waypoint of a current route of an autonomous vehicle from a first waypoint to a second waypoint.

In some embodiments, the command changes a label of an object previously recognized by the autonomous vehicle. For example, an object recognition algorithm of the perception system 303 labels objects identified in images captured by one or more of the sensors 301. In some cases, the labeling is incorrect, which can have negative effects on an autonomous vehicle's ability to navigate a route. For example, the object recognition algorithm may label, in some circumstances, a plastic bag as an animal. This labeling causes, in some circumstances, the autonomous vehicle to stop or otherwise avoid colliding with the labeled animal. A human operator provides a command, in some embodiments, to change a labeled object to a different label. After the label is changed, in some embodiments, the perception system 303 facilitates generation of a different motion plan by the motion planning system 305.

In some embodiments, the command defines a selected motion plan for the autonomous vehicle to execute. For example, some embodiments present an operator with a list of possible motion plans. An input selecting one of the possible motion plans is then provided and thus received in operation 1320.

In operation 1322, the command accepted in operation 1320 is executed. For example, if the command indicates a brake, steering, or accelerator position, the autonomous vehicle controls are positioned to be consistent with those indicated in the command.

In operation 1324, autonomous execution of the route is resumed after completion of the first portion. For example, in some aspects, an operator responsible for remote control of the autonomous vehicle may transmit a release command to the autonomous vehicle, indicating it is to resume autonomous control. In some aspects, when the autonomous vehicle detects that the first portion of the route has been completed, the autonomous vehicle automatically (without operator input) resumes autonomous navigation of the route.

FIG. 14 is a block diagram showing one example of a software architecture 1400 for a computing device. The software architecture 1402 may be used in conjunction with various hardware architectures, for example, as described herein. FIG. 14 is merely a non-limiting example of a software architecture 1402 and many other architectures may be implemented to facilitate the functionality described herein. A representative hardware layer 1404 is illustrated and can represent, for example, any of the above-referenced computing devices. In some examples, the hardware layer 1404 may be implemented according to an architecture 1500 of FIG. 15 and/or the software architecture 1402 of FIG. 14.

The representative hardware layer 1404 comprises one or more processing units 1406 having associated executable instructions 1408. The executable instructions 1408 represent the executable instructions of the software architecture 1402, including implementation of the methods, modules, components, and so forth of FIGS. 1-13. The hardware layer 1404 also includes memory and/or storage modules 1410, which also have the executable instructions 1408. The hardware layer 1404 may also comprise other hardware 1412, which represents any other hardware of the hardware layer 1404, such as the other hardware illustrated as part of the architecture 1400.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and a presentation layer 1444. Operationally, the applications 1420 and/or other components within the layers may invoke API calls 1424 through the software stack and receive a response, returned values, and so forth illustrated as messages 1426 in response to the API calls 1424. The layers illustrated are representative in nature and not all software architectures have all layers. For example, some mobile or special-purpose operating systems may not provide a frameworks/middleware 1418 layer, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. In some examples, the services 1430 include an interrupt service. The interrupt service may detect the receipt of a hardware or software interrupt and, in response, cause the software architecture 1402 to pause its current processing and execute an ISR when an interrupt is received. The ISR may generate an alert.

The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1416 may provide a common infrastructure that may be used by the applications 1420 and/or other components and/or layers. The libraries 1416 typically provide functionality that allows other software modules to perform tasks in an easier fashion than by interfacing directly with the underlying operating system 1414 functionality (e.g., kernel 1428, services 1430, and/or drivers 1432). The libraries 1416 may include system libraries 1434 (e.g., C standard library) that may provide functions such as memory allocation functions, string manipulation functions, mathematic functions, and the like. In addition, the libraries 1416 may include API libraries 1436 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) may provide a higher-level common infrastructure that may be used by the applications 1420 and/or other software components/modules. For example, the frameworks 1418 may provide various graphical user interface (GUI) functions, high-level resource management, high-level location services, and so forth. The frameworks 1418 may provide a broad spectrum of other APIs that may be used by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a contacts application, a browser application, a book reader application, a location application, a media application, a messaging application, and/or a game application. The third-party applications 1442 may include any of the built-in applications 1440 as well as a broad assortment of other applications. In a specific example, the third-party application 1442 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1442 may invoke the API calls 1424 provided by the mobile operating system such as the operating system 1414 to facilitate functionality described herein.

The applications 1420 may use built-in operating system functions (e.g., kernel 1428, services 1430, and/or drivers 1432), libraries (e.g., system libraries 1434, API libraries 1436, and other libraries 1438), or frameworks/middleware 1418 to create user interfaces to interact with users of the system. Alternatively, or additionally, in some systems, interactions with a user may occur through a presentation layer, such as the presentation layer 1444. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 14, this is illustrated by a virtual machine 1448. A virtual machine creates a software environment where applications/modules can execute as if they were executing on a hardware computing device. The virtual machine 1448 is hosted by a host operating system (e.g., the operating system 1414) and typically, although not always, has a virtual machine monitor 1446, which manages the operation of the virtual machine 1448 as well as the interface with the host operating system (e.g., the operating system 1414). A software architecture executes within the virtual machine 1448, such as an operating system 1450, libraries 1452, frameworks/middleware 1454, applications 1456, and/or a presentation layer 1458. These layers of software architecture executing within the virtual machine 1448 can be the same as corresponding layers previously described or may be different.

FIG. 15 is a block diagram illustrating a computing device hardware architecture 1500, within which a set or sequence of instructions can be executed to cause a machine to perform examples of any one of the methodologies discussed herein. The hardware architecture 1500 describes a computing device for executing any of the methods or processes described herein. For example, in various embodiments, the hardware architecture 1500 is implemented in one or more of the vehicle autonomy system 302, remote controller 208, service request allocator 204, controllers 502, 208a, 208b, 512, 523, 532, or 502.

The architecture 1500 may operate as a standalone device or may be connected (e.g., networked) to other machines. In a networked deployment, the architecture 1500 may operate in the capacity of either a server or a client machine in server-client network environments, or it may act as a peer machine in peer-to-peer (or distributed) network environments. The architecture 1500 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1500 includes a processor unit 1502 comprising at least one processor (e.g., a central processing unit (CPU), a graphics processing unit (GPU), or both, processor cores, compute nodes). The architecture 1500 may further comprise a main memory 1504 and a static memory 1506, which communicate with each other via a link 1508 (e.g., bus). The architecture 1500 can further include a video display unit 1510, an input device 1512 (e.g., a keyboard), and a UI navigation device 1514 (e.g., a mouse). In some examples, the video display unit 1510, input device 1512, and UI navigation device 1514 are incorporated into a touchscreen display. The architecture 1500 may additionally include a storage device 1516 (e.g., a drive unit), a signal generation device 1518 (e.g., a speaker), a network interface device 1520, and one or more sensors (not shown), such as a Global Positioning System (GPS) sensor, compass, accelerometer, or other sensor.

In some examples, the processor unit 1502 or another suitable hardware component may support a hardware interrupt. In response to a hardware interrupt, the processor unit 1502 may pause its processing and execute an ISR, for example, as described herein.

The storage device 1516 includes a machine-readable medium 1522 on which is stored one or more sets of data structures and instructions 1524 (e.g., software) embodying or used by any one or more of the methodologies or functions described herein. The instructions 1524 can also reside, completely or at least partially, within the main memory 1504, within the static memory 1506, and/or within the processor unit 1502 during execution thereof by the architecture 1500, with the main memory 1504, the static memory 1506, and the processor unit 1502 also constituting machine-readable media.

Executable Instructions and Machine-Storage Medium

The various memories (i.e., 1504, 1506, and/or memory of the processor unit(s) 1502) and/or storage device 1516 may store one or more sets of instructions and data structures (e.g., instructions) 1524 embodying or used by any one or more of the methodologies or functions described herein. These instructions, when executed by processor unit(s) 1502 cause various operations to implement the disclosed examples.

As used herein, the terms "machine-storage medium," "device-storage medium," "computer-storage medium" (referred to collectively as "machine-storage medium" 1522) mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1522 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1524 can further be transmitted or received over a communications network 1526 using a transmission medium via the network interface device 1520 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

Example 1 is a method for controlling an autonomous vehicle, comprising: generating a route for an autonomous vehicle, the route defining waypoints between an origin location and a destination location; requesting the autonomous vehicle provide service on the route; receiving, from the autonomous vehicle, a request for remote assistance with servicing the route; and providing input to the autonomous vehicle defining a change in a control setting of the autonomous vehicle in response to the request.

In Example 2, the subject matter of Example 1 optionally includes wherein the route is generated to indicate a location within the route that requires remote assistance for the autonomous vehicle, and wherein the request for remote assistance indicates the autonomous vehicle is proximate to the location.

In Example 3, the subject matter of any one or more of Examples 1-2 optionally include wherein the autonomous vehicle is configured to generate the request for remote assistance in response to a motion plan confidence value meeting a criterion.

In Example 4, the subject matter of any one or more of Examples 1-3 optionally include wherein the autonomous vehicle is of a particular type, the method further comprising identifying the location within the route that requires remote assistance for the autonomous vehicle based on the particular type.

In Example 5, the subject matter of any one or more of Examples 1-4 optionally include receiving second input from an operator console, wherein the input is provided to the autonomous vehicle based on the second input.

In Example 6, the subject matter of Example 5 optionally includes receiving data derived from an on-board sensor of the autonomous vehicle, and displaying the data on an electronic display proximate to the operator console.

In Example 7, the subject matter of Example 6 optionally includes wherein the received data is derived from a visual camera on-board the autonomous vehicle.

In Example 8, the subject matter of any one or more of Examples 1-7 optionally include providing a command to the autonomous vehicle to release it from remote control, wherein the autonomous vehicle is configured to continue autonomous navigation of the route in response to the release command.

Example 9 is a system for controlling an autonomous vehicle, comprising: hardware processing circuitry; one or more hardware memories storing instructions that when executed configure the hardware processing circuitry to perform operations comprising: generating a route for an autonomous vehicle, the route defining waypoints between an origin location and a destination location requesting the autonomous vehicle provide service on the route; receiving, from the autonomous vehicle, a request for remote assistance with servicing the route; and providing input to the autonomous vehicle defining a change in a control setting of the autonomous vehicle in response to the request.

In Example 10, the subject matter of Example 9 optionally includes wherein the route is generated to indicate a location within the route that requires remote assistance for the autonomous vehicle, and wherein the request for remote assistance indicates the autonomous vehicle is proximate to the location.

In Example 11, the subject matter of any one or more of Examples 9-10 optionally include wherein the autonomous vehicle is configured to generate the request for remote assistance in response to a motion plan confidence value meeting a criterion.

In Example 12, the subject matter of any one or more of Examples 9-11 optionally include wherein the autonomous vehicle is of a particular type, the operations further comprising identifying the location within the route that requires remote assistance for the autonomous vehicle based on the particular type.

In Example 13, the subject matter of any one or more of Examples 9-12 optionally include the operations further comprising receiving second input from an operator console, wherein the input is provided to the autonomous vehicle based on the second input.

In Example 14, the subject matter of Example 13 optionally includes the operations further comprising receiving data derived from an on-board sensor of the autonomous vehicle, and displaying the data on an electronic display proximate to the operator console.

In Example 15, the subject matter of Example 14 optionally includes wherein the received data is derived from a visual camera on-board the autonomous vehicle.

In Example 16, the subject matter of any one or more of Examples 9-15 optionally include the operations further comprising providing a command to the autonomous vehicle to release it from remote control, wherein the autonomous vehicle is configured to continue autonomous navigation of the route in response to the release command.

Example 17 is a non-transitory computer readable storage medium comprising instructions that when executed configure hardware processing circuitry to perform operations comprising: generating a route for an autonomous vehicle, the route defining waypoints between an origin location and a destination location requesting the autonomous vehicle provide service on the route; receiving, from the autonomous vehicle, a request for remote assistance with servicing the route; and providing input to the autonomous vehicle defining a change in a control setting of the autonomous vehicle in response to the request.

In Example 18, the subject matter of Example 17 optionally includes wherein the route is generated to indicate a location within the route that requires remote assistance for the autonomous vehicle, and wherein the request for remote assistance indicates the autonomous vehicle is proximate to the location.

In Example 19, the subject matter of any one or more of Examples 17-18 optionally include wherein the autonomous vehicle is configured to generate the request for remote assistance in response to a motion plan confidence value meeting a criterion.

In Example 20, the subject matter of any one or more of Examples 17-19 optionally include wherein the autonomous vehicle is of a particular type, the operations further comprising identifying the location within the route that requires remote assistance for the autonomous vehicle based on the particular type.

In Example 21, the subject matter of any one or more of Examples 17-20 optionally include the operations further comprising receiving second input from an operator console, wherein the input is provided to the autonomous vehicle based on the second input.

In Example 22, the subject matter of Example 21 optionally includes the operations further comprising receiving data derived from an on-board sensor of the autonomous vehicle, and displaying the data on an electronic display proximate to the operator console.

In Example 23, the subject matter of Example 22 optionally includes wherein the received data is derived from a visual camera on-board the autonomous vehicle.

In Example 24, the subject matter of any one or more of Examples 17-23 optionally include the operations further comprising providing a command to the autonomous vehicle to release it from remote control, wherein the autonomous vehicle is configured to continue autonomous navigation of the route in response to the release command.

Example 25 is an apparatus, comprising: means for generating a route for an autonomous vehicle, the route defining waypoints between an origin location and a destination location means for requesting the autonomous vehicle provide service on the route; means for receiving, from the autonomous vehicle, a request for remote assistance with servicing the route; and means for providing input to the autonomous vehicle defining a change in a control setting of the autonomous vehicle in response to the request.

In Example 26, the subject matter of Example 25 optionally includes wherein the route is generated to indicate a location within the route that requires remote assistance for the autonomous vehicle, and wherein the request for remote assistance indicates the autonomous vehicle is proximate to the location.

In Example 27, the subject matter of any one or more of Examples 25-26 optionally include wherein the autonomous vehicle is configured to generate the request for remote assistance in response to a motion plan confidence value meeting a criterion.

In Example 28, the subject matter of any one or more of Examples 25-27 optionally include wherein the autonomous vehicle is of a particular type, the apparatus further comprising means for identifying the location within the route that requires remote assistance for the autonomous vehicle based on the particular type.

In Example 29, the subject matter of any one or more of Examples 25-28 optionally include means for receiving second input from an operator console, wherein the input is provided to the autonomous vehicle based on the second input.

In Example 30, the subject matter of Example 29 optionally includes means for receiving data derived from an on-board sensor of the autonomous vehicle, and means for displaying the data on an electronic display proximate to the operator console.

In Example 31, the subject matter of Example 30 optionally includes wherein the received data is derived from a visual camera on-board the autonomous vehicle.

In Example 32, the subject matter of Example 31 optionally includes means for providing a command to the autonomous vehicle to release it from remote control, wherein the autonomous vehicle is configured to continue autonomous navigation of the route in response to the release command.

The invention claimed is:

1. A method for controlling an autonomous vehicle, comprising:
 generating, by a computing system, a route for the autonomous vehicle, the route defining waypoints between an origin location and a destination location to cause the autonomous vehicle to be routed to each waypoint between the origin location and the destination location;
 determining, by the computing system, a type of the autonomous vehicle based on data provided by a manufacturer of the autonomous vehicle;
 identifying, by the computing system, based on the type of the autonomous vehicle, a route portion of the generated route that requires remote assistance in response to a determination that visibility available to one or more sensors included on the autonomous vehicle is inadequate to provide for successful autonomous operation;
 causing, by the computing system via a wireless communication link, the autonomous vehicle to autonomously execute the generated route until a vehicle control system of the autonomous vehicle detects that the autonomous vehicle is located within a predetermined threshold distance from a waypoint associated with the route portion of the generated route that requires remote assistance;
 receiving, by the computing system from the autonomous vehicle via the wireless communication link, a request for the remote assistance with servicing the route based on the vehicle control system of the autonomous vehicle detecting that the autonomous vehicle is located within the predetermined threshold distance from the waypoint associated with the route portion of the generated route that requires the remote assistance;
 processing the request to determine which one of a plurality of reasons, each associated with a different reason code value, triggered transmission of the request for the remote assistance;
 causing, by the computing system via the wireless communication link, the vehicle control system of the autonomous vehicle to accept remote control commands including a change in a control setting of the autonomous vehicle;
 receiving, by the computing system via the wireless communication link, input defining the change in the control setting of the autonomous vehicle, the input comprising an instruction for the autonomous vehicle to move forward by a specified distance to obtain better visibility of the one or more sensors of the autonomous vehicle;
 generating, by the computing system, control signals based on the input defining the change in the control setting of the autonomous vehicle, the change in the control setting comprising at least one of a throttle position setting, a steering position setting, a brake setting, or an acceleration setting;
 causing, by the computing system via the wireless communication link, the autonomous vehicle to execute the control signals; and
 causing, by the computing system via the wireless communication link, the autonomous vehicle to resume the autonomous execution of the generated route after completion of the route portion that requires the remote assistance.

2. The method of claim 1, wherein the route is generated to indicate a location within the route that requires the remote assistance for the autonomous vehicle, wherein the request for the remote assistance indicates the autonomous vehicle is proximate to the location, and wherein an operator at the computing system who is providing the remote assistance closes at least the route portion associated with the waypoint of the generated route that requires the remote assistance to other autonomous vehicles in response to receiving the request for remote assistance.

3. The method of claim 1, wherein the autonomous vehicle is configured to generate the request for remote assistance in response to a motion plan confidence value meeting a criterion, and wherein determining the type of the autonomous vehicle comprise determining that the autonomous vehicle is capable of making unprotected left turns when oncoming traffic is traveling at less than a threshold speed.

4. The method of claim 1, further comprising:
 receiving second input, wherein the second input is provided to the autonomous vehicle.

5. The method of claim 4, further comprising:
 receiving data derived from an on-board sensor of the autonomous vehicle; and
 displaying the data on an electronic display.

6. The method of claim 5, wherein the received data is derived from a visual camera on-board the autonomous vehicle.

7. A system for controlling an autonomous vehicle, comprising:
hardware processing circuitry; and
one or more hardware memories storing instructions that when executed configure the hardware processing circuitry to perform operations comprising:
generating a route for the autonomous vehicle, the route defining waypoints between an origin location and a destination location to cause the autonomous vehicle to be routed to each waypoint between the origin location and the destination location;
determining a type of the autonomous vehicle based on data provided by a manufacturer of the autonomous vehicle;
identifying based on the type of the autonomous vehicle, a route portion of the generated route that requires remote assistance in response to a determination that visibility available to one or more sensors included on the autonomous vehicle is inadequate to provide for successful autonomous operation;
causing, via a wireless communication link, the autonomous vehicle to autonomously execute the generated route until a vehicle control system of the autonomous vehicle detects that the autonomous vehicle is located within a predetermined threshold distance from a waypoint associated with the route portion of the generated route that requires remote assistance;
receiving, via the wireless communication link, a request for the remote assistance with servicing the route based on the vehicle control system of the autonomous vehicle detecting that the autonomous vehicle is located within the predetermined threshold distance from the waypoint associated with the route portion of the generated route that requires the remote assistance;
processing the request to determine which one of a plurality of reasons, each associated with a different reason code value, triggered transmission of the request for the remote assistance;
causing, via the wireless communication link, the vehicle control system of the autonomous vehicle to accept remote control commands including a change in a control setting of the autonomous vehicle;
receiving, via the wireless communication link, input defining the change in the control setting of the autonomous vehicle, the input comprising an instruction for the autonomous vehicle to move forward by a specified distance to obtain better visibility of the one or more sensors of the autonomous vehicle;
generating control signals based on the input defining the change in the control setting of the autonomous vehicle, the change in the control setting comprising at least one of a throttle position setting, a steering position setting, a brake setting, or an acceleration setting;
causing, via the wireless communication link, the autonomous vehicle to execute the control signals; and
causing, via the wireless communication link, the autonomous vehicle to resume the autonomous execution of the generated route after completion of the route portion that requires the remote assistance.

8. The method of claim 1, wherein the determination that the visibility is inadequate to provide for successful autonomous operation comprises a determination that a weather condition at the waypoint prevents the one or more sensors from obtaining sensing data necessary for successful autonomous operation.

9. The method of claim 1, further comprising:
determining an estimated duration of time needed by the remote assistance to generate the control signals based on the input defining the change in the control setting of the autonomous vehicle;
computing a buffer time based on the estimated duration of time; and
delaying scheduling of remote assistance for another autonomous vehicle based on the buffer time.

10. The method of claim 1, wherein the request for the remote assistance received from the autonomous vehicle comprises a reason code that indicates a reason remote control is requested by the autonomous vehicle, the request for the remote assistance received from the autonomous vehicle comprising an image or video captured by a front facing camera of the autonomous vehicle.

11. The method of claim 10, further comprising presenting, based on the reason code, the reason why the request for remote control was initiated by the autonomous vehicle to an operator at the computing system who is providing the remote assistance.

12. The method of claim 1, wherein the autonomous vehicle generates the request for the remote assistance by:
determining that a level of urgency associated with the route portion that requires remote assistance transgresses a threshold value, the level of urgency being determined based on detection of a person or other vehicles behind the autonomous vehicle; and
in response to determining that the level of urgency associated with the route portion that requires remote assistance transgresses the threshold value, associating, by the autonomous vehicle, a priority value comprising a first value with the generated request for the remote assistance.

13. A non-transitory computer readable storage medium comprising instructions that when executed configure hardware processing circuitry to perform operations comprising:
generating a route for an autonomous vehicle, the route defining waypoints between an origin location and a destination location to cause the autonomous vehicle to be routed to each waypoint between the origin location and the destination location;
determining a type of the autonomous vehicle based on data provided by a manufacturer of the autonomous vehicle;
identifying based on the type of the autonomous vehicle, a route portion of the generated route that requires remote assistance in response to a determination that visibility available to one or more sensors included on the autonomous vehicle is inadequate to provide for successful autonomous operation;
causing, via a wireless communication link, the autonomous vehicle to autonomously execute the generated route until a vehicle control system of the autonomous vehicle detects that the autonomous vehicle is located within a predetermined threshold distance from a waypoint associated with the route portion of the generated route that requires remote assistance;
receiving, via the wireless communication link, a request for the remote assistance with servicing the route based on the vehicle control system of the autonomous vehicle detecting that the autonomous vehicle is located within the predetermined threshold distance from the waypoint associated with the route portion of the generated route that requires the remote assistance;

processing the request to determine which one of a plurality of reasons, each associated with a different reason code value, triggered transmission of the request for the remote assistance;

causing, via the wireless communication link, the vehicle control system of the autonomous vehicle to accept remote control commands including a change in a control setting of the autonomous vehicle;

receiving, via the wireless communication link, input defining the change in the control setting of the autonomous vehicle, the input comprising an instruction for the autonomous vehicle to move forward by a specified distance to obtain better visibility of the one or more sensors of the autonomous vehicle;

generating control signals based on the input defining the change in the control setting of the autonomous vehicle, the change in the control setting comprising at least one of a throttle position setting, a steering position setting, a brake setting, or an acceleration setting;

causing, via the wireless communication link, the autonomous vehicle to execute the control signals; and causing, via the wireless communication link, the autonomous vehicle to resume the autonomous execution of the generated route after completion of the route portion that requires the remote assistance.

14. The non-transitory computer readable storage medium of claim 13, wherein the route is generated to indicate a location within the route that requires the remote assistance for the autonomous vehicle, and wherein the request for the remote assistance indicates the autonomous vehicle is proximate to the location.

15. The non-transitory computer readable storage medium of claim 13, wherein the autonomous vehicle is configured to generate the request for the remote assistance in response to a motion plan confidence value meeting a criterion, and wherein an operator at the computing system who is providing the remote assistance changes a label of an object previously recognized by the autonomous vehicle in images captured by the one or more sensors of the autonomous vehicle.

16. The method of claim 1, wherein the change in the control setting includes an increase or a decrease of a motion vector representing forward direction of the autonomous vehicle, or a change in direction of the motion vector.

17. The method of claim 1, wherein the change in the control setting of the autonomous vehicle comprises a modification to the waypoint of the route associated with the route portion that requires the remote assistance.

18. The method of claim 1, wherein identifying, based on the type of autonomous vehicle, the route portion of the generated route that required remote assistance is based on capability constraints associated with the type of autonomous vehicle.

19. The method of claim 1, further comprising:
identifying, based on vehicle capability data for the type of autonomous vehicle, a second route portion that the type of autonomous vehicle is not capable of traversing; and
removing a transition to the second route portion from the generated route.

20. The method of claim 1, wherein the change in control setting for the autonomous vehicle comprises at least one of a turn signal setting, a horn control setting, or an exterior lights setting.

* * * * *